US010097491B2

(12) United States Patent
Lauer et al.

(10) Patent No.: US 10,097,491 B2
(45) Date of Patent: Oct. 9, 2018

(54) DATA CACHING USING MULTICAST GROUPS IN A VEHICLE COMMUNICATION SYSTEM

(71) Applicant: GOGO LLC, Chicago, IL (US)

(72) Inventors: Bryan Adrian Lauer, Chicago, IL (US); Rukmani Loganathan, Bartlett, IL (US)

(73) Assignee: GOGO LLC, Chicago, IL (US)

(*) Notice: Subject to any disclaimer, the term of this patent is extended or adjusted under 35 U.S.C. 154(b) by 0 days.

(21) Appl. No.: 15/703,523

(22) Filed: Sep. 13, 2017

(65) Prior Publication Data
US 2018/0026927 A1 Jan. 25, 2018

Related U.S. Application Data

(62) Division of application No. 14/309,342, filed on Jun. 19, 2014, now Pat. No. 9,787,619.
(Continued)

(51) Int. Cl.
G06F 15/16 (2006.01)
H04L 12/58 (2006.01)
(Continued)

(52) U.S. Cl.
CPC ......... H04L 51/14 (2013.01); H04B 7/18506 (2013.01); H04L 67/12 (2013.01)

(58) Field of Classification Search
CPC ...... H04L 51/14; H04L 67/12; H04B 7/18506
See application file for complete search history.

(56) References Cited

U.S. PATENT DOCUMENTS 8,391,195 B1 3/2013 Singh et al.
8,416,732 B2 4/2013 Bothorel
(Continued)

FOREIGN PATENT DOCUMENTS

CN 1462552 A 12/2003
EP 0890907 A1 1/1999
(Continued)

OTHER PUBLICATIONS

International Search Report and Written Opinion for Application No. PCT/US2014/064763 dated Mar. 3, 2015.
(Continued)

Primary Examiner — Krisna Lim
(74) Attorney, Agent, or Firm — Marshall, Gerstein & Borun LLP; Randall G. Rueth

(57) ABSTRACT

A method of caching communications for devices being transported by vehicles includes receiving, at a vehicle via forward link, a message directed to the vehicle and a plurality of other vehicles. The message includes: content to be delivered to a requesting mobile device being transported by the vehicle or one of the other vehicles, and an indication of at least some of the content to be cached in one or more computer readable storage media disposed on the vehicle. The method further includes determining if the requesting mobile device is being transported by the vehicle, and, if so, forwarding at least some of the content to the requesting mobile device. At least some of the content is then stored on the one or more computer readable storage media disposed in the vehicle based on the indication of the least some of the content to be cached.

20 Claims, 8 Drawing Sheets

Related U.S. Application Data

(60) Provisional application No. 61/901,869, filed on Nov. 8, 2013.

(51) Int. Cl.
*H04B 7/185* (2006.01)
*H04L 29/08* (2006.01)

(56) References Cited

U.S. PATENT DOCUMENTS

| | | |
|---|---|---|
| 8,983,455 B1 | 3/2015 | Frolov et al. |
| 9,031,716 B2 | 5/2015 | Myers et al. |
| 9,083,425 B1 | 7/2015 | Frolov et al. |
| 9,302,782 B2 | 4/2016 | Frolov et al. |
| 2002/0004401 A1 | 1/2002 | Heppe et al. |
| 2002/0007404 A1* | 1/2002 | Vange ............... G06F 9/5027 709/217 |
| 2002/0160773 A1 | 10/2002 | Gresham et al. |
| 2003/0163646 A1 | 8/2003 | O'Neil |
| 2004/0004967 A1 | 1/2004 | Nakatsugawa et al. |
| 2004/0076155 A1* | 4/2004 | Yajnik ............... H04L 45/306 370/389 |
| 2006/0040612 A1 | 2/2006 | Min |
| 2006/0252422 A1 | 11/2006 | Kauffman et al. |
| 2008/0240029 A1 | 10/2008 | Lynch et al. |
| 2009/0096857 A1 | 4/2009 | Frisco et al. |
| 2010/0146114 A1 | 6/2010 | Morris |
| 2011/0314488 A1 | 12/2011 | Keen et al. |
| 2014/0189046 A1 | 7/2014 | Vezzuto et al. |
| 2014/0282684 A1 | 9/2014 | Keen et al. |
| 2014/0282727 A1 | 9/2014 | Keen et al. |
| 2016/0127895 A1* | 5/2016 | Bangole ............... H04W 12/04 380/279 |
| 2017/0078729 A1* | 3/2017 | Karlsson ............... H04L 67/12 |

FOREIGN PATENT DOCUMENTS

| | | |
|---|---|---|
| JP | 2004005447 A | 1/2004 |
| JP | 2004280847 A | 10/2004 |
| JP | 2004532579 A | 10/2004 |
| JP | 2009095040 A | 4/2009 |
| JP | 2010045847 A | 2/2010 |
| WO | WO-0215582 A1 | 2/2002 |
| WO | WO-02089359 A1 | 11/2002 |

OTHER PUBLICATIONS

First Office Action, Japanese Patent Application No. 2016-528847, dated Oct. 25, 2016.
State Intellectual Property Office of P.R China, Notification of First Office Action for Chinese Patent Application No. 201480072678.9, dated Jan. 5, 2017.
Second Office Action for Japanese Patent Application No. 2016-528847, dated Feb. 7, 2017.
State Intellectual Property Office of P.R China, Notification of Second Office Action for Chinese Patent Application No. 201480072678.9, dated Jul. 7, 2017.
Office Action for Japanese Patent Application No. 2017-158696 dated Jul. 10, 2018.

\* cited by examiner

DATA CACHING USING MULTICAST GROUPS IN A VEHICLE COMMUNICATION SYSTEM

CROSS-REFERENCE TO RELATED APPLICATIONS

The present application is a divisional of U.S. patent application Ser. No. 14/309,342 entitled "DATA CACHING IN A HYBRID COMMUNICATIONS SYSTEM" filed Jun. 19, 2014 and issued Oct. 10, 2017 as U.S. Pat. No. 9,787,619 B2, which claims priority to U.S. Provisional Patent Application No. 61/901,869 entitled "DATA CACHING IN A HYBRID COMMUNICATIONS SYSTEM" filed Nov. 8, 2013, the entire contents of which are hereby incorporated by reference herein.

Further, the present application is related to U.S. Pat. No. 9,326,217 entitled "OPTIMIZING USAGE OF MODEMS FOR DATA DELIVERY TO DEVICES ON VEHICLES"; U.S. Pat. No. 9,197,314 entitled "DATA DELIVERY TO DEVICES ON VEHICLES USING MULTIPLE FORWARD LINKS"; U.S. Pat. No. 9,369,991 entitled "HYBRID COMMUNICATIONS FOR DEVICES ON VEHICLES"; U.S. Pat. No. 9,087,193 entitled "COMMUNICATIONS SYSTEM AND METHOD FOR NODES ASSOCIATED WITH A VEHICLE"; U.S. Pat. No. 9,088,613 entitled "GROUND SYSTEM FOR VEHICLE DATA DISTRIBUTION"; and co-pending U.S. patent application Ser. No. 13/675,200 entitled "VEHICLE DATA DISTRIBUTION SYSTEM AND METHOD." The entire contents of these related patents and patent application are hereby incorporated by reference in their entireties.

TECHNICAL FIELD

The instant disclosure generally relates to airborne communications and, in particular, to a hybrid communications system in which data requested by a mobile in a particular vehicle is cached on a plurality of vehicles including the particular vehicle.

BACKGROUND

Some existing airlines and other transportation companies provide services, such as Wi-Fi or other data delivery services, to a device that is on-board a vehicle while the vehicle is traveling en route to a destination. The on-board device may be, for example, a device that is fixedly connected to the vehicle (e.g., a device that is included in a Line Replaceable Unit (LRU) on an aircraft), or the on-board device may be a mobile computing device such as a smart phone, tablet or laptop computing device that is temporarily being transported by the vehicle. To establish communications for services to such on-board devices, providers often utilize a wireless communication link such as a direct Air-to-Ground (ATG) link or a satellite link over which communications or data is delivered to and from the vehicle. The wireless communication link is typically a bi-directional communication link over which all forward data (i.e., data delivered to the vehicle) and all reverse data (i.e., data sent from the vehicle) is transmitted and received.

In certain circumstances, the bi-directional communication link on which an on-board data service depends can be unavailable (e.g., when the vehicle travels to a location that is outside of network coverage), slow or busy (e.g., with a queue of pending upload requests), or malfunctioning, thus rendering the on-board data services unavailable to or unusable by the devices. Further, because all communications for the set of devices that are on-board a vehicle typically traverse the same bi-directional link, the download or upload behavior of certain data content types, data files, etc. can appear inconsistent to users of the service. For example, messages or communications sent by a device might appear to have zero latency while the arrival of requested content at the device appears to be significantly delayed.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a method of managing communications to and from devices being transported by vehicles comprises receiving, from a particular vehicle via a reverse link, a request for content to be delivered to a requesting device, the requesting device being a mobile computing device that is temporarily being transported by the particular vehicle, and, in response to forwarding the request to a content provider, receiving, from the content provider, a message including the content to be delivered to the requesting device. The method further comprises generating, with the one or more computer processors, a modified message including an indication of at least some of the content, the at least some of the content to be cached in a plurality of computer readable storage media disposed in a plurality of vehicles, and the plurality of vehicle including the particular vehicle, and causing, with the one or more computer processors, the modified message to be sent to a plurality of vehicles via a forward link.

In another embodiment, a method of caching communications for devices being transported by vehicles comprises receiving, at a vehicle via a forward link, a message directed to the vehicle and a plurality of other vehicles, the message including: (i) content to be delivered to a requesting mobile computing device being transported by the vehicle or one of the plurality of other vehicles, and (ii) an indication of at least some of the content to be cached in one or more computer readable storage media disposed on the vehicle. The method further includes determining, with one or more processors, if the requesting mobile computing device is being transported by the vehicle, if the requesting mobile computing device is being transported by the vehicle, forwarding at least some of the content to the requesting mobile computing device, and storing, with the one or more processors, the at least some of the content on the one or more computer readable storage media disposed in the vehicle based on the indication of the least some of the content to be cached.

In still another embodiment, a computer device for managing communication to and from vehicles via data caching comprises one or more processors and one or more memories coupled to the one or more processors, wherein the one or more memories include computer executable instructions stored therein that. When executed by the one or more processors, the computer executable instructions cause the one or more processors to receive, at a vehicle via a forward link, a message directed to the vehicle and a plurality of other vehicles, the message including: (i) content to be delivered to a requesting mobile computing device being transported by the vehicle or one of the plurality of other vehicles, and (ii) an indication of at least some of the content to be cached in one or more computer readable storage media disposed on the vehicle. Further, when executed by the one or more processors, the computer executable instructions cause the one or more processors to determine if the requesting mobile computing device is being transported by the vehicle, if the requesting mobile computing device is being transported by the vehicle, forward at least some of the content to the requesting mobile computing device, and store the at least some of the content on the one or more computer readable storage media disposed in the vehicle based on the indication of the least some of the content to be cached.

BRIEF DESCRIPTION

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Additionally, any or all of the contents of the present disclosure may operate in conjunction with any or all of the contents of the disclosures of U.S. Pat. No. 9,326,217 entitled "OPTIMIZING USAGE OF MODEMS FOR DATA DELIVERY TO DEVICES ON VEHICLES"; U.S. Pat. No. 9,197,314 entitled "DATA DELIVERY TO DEVICES ON VEHICLES USING MULTIPLE FORWARD LINKS"; U.S. Pat. No. 9,369,991 entitled "HYBRID COMMUNICATIONS FOR DEVICES ON VEHICLES"; U.S. Pat. No. 9,087,193 entitled "COMMUNICATIONS SYSTEM AND METHOD FOR NODES ASSOCIATED WITH A VEHICLE"; U.S. Pat. No. 9,088,613 entitled "GROUND SYSTEM FOR VEHICLE DATA DISTRIBUTION"; and co-pending U.S. patent application Ser. No. 13/675,200 entitled "VEHICLE DATA DISTRIBUTION SYSTEM AND METHOD"; the contents of which are hereby incorporated by reference in their entireties.

Hybrid Communication System Overview

Figure 1:
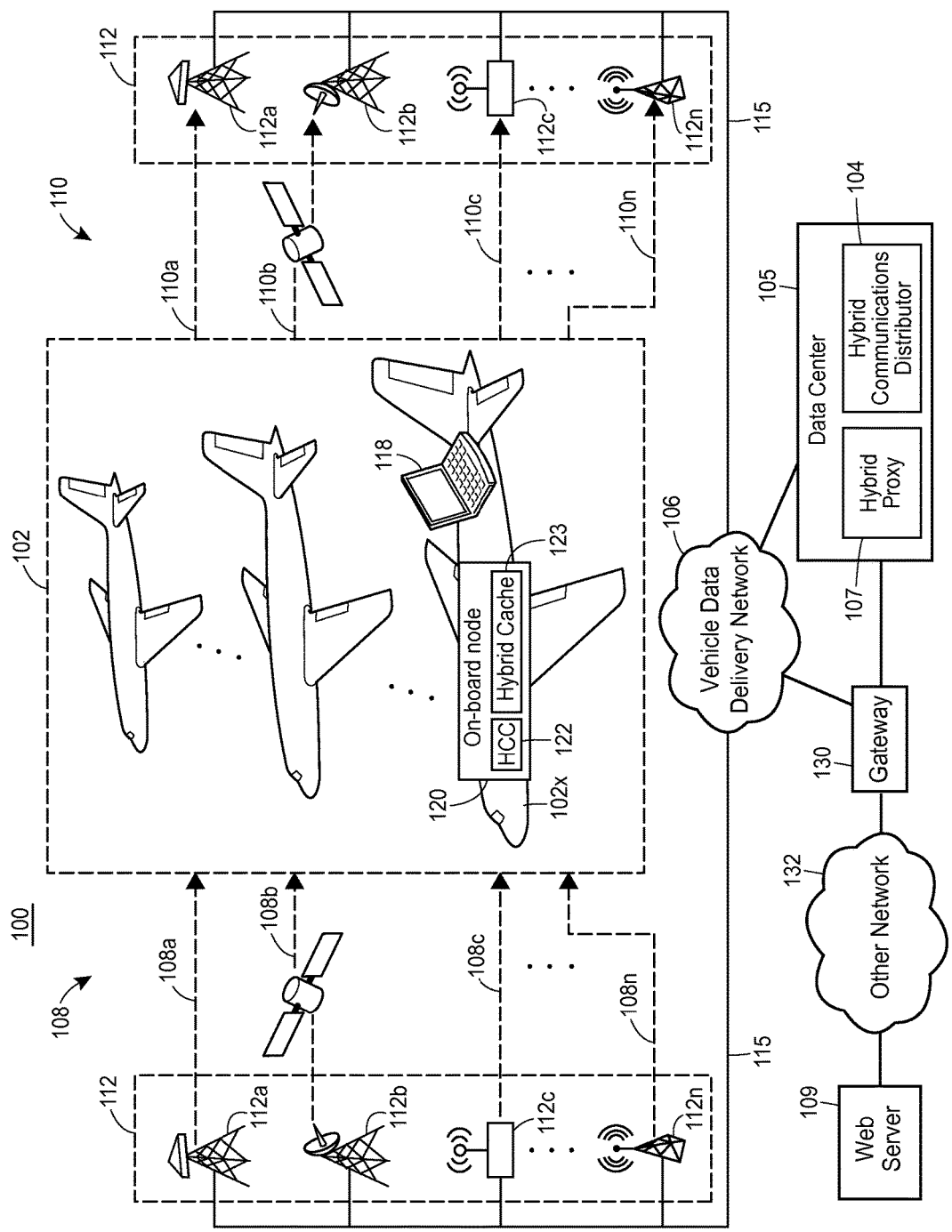
FIG. 1 illustrates an exemplary hybrid communications system for delivering data to and from devices that are on-board a set of vehicles.

FIG. 1 is a block diagram depicting an example hybrid communications system 100 in which the data caching methods, discussed further below with reference to FIGS. 3-7, may be implemented. The system 100 is configured to deliver data, information, or content to a specific device on-board one of a plurality of vehicles 102 (e.g., the device 118 on-board the vehicle 102x) from a data center 105 or from a hybrid communications distributor 104 included in the data center 105. In some implementations, the hybrid communications system 100 is configured to deliver feedback information from the vehicle 102x to the data center 105 or the hybrid communications distributor 104, and the data center 105 or the hybrid communications distributor 104 may use the feedback information to inform subsequent data delivery to the on-board device 118 or to other on-board devices. A hybrid proxy 107 may be configured to receive requests for content, data, or information from the vehicles 102, forward requests to content providers, and modify response messages such that included content may be cached on-board the vehicles 102. In an embodiment, the hybrid communications distributor 104, the hybrid proxy 107, and the data center 105 are communicatively connected to the vehicles 102 via one or more vehicle data delivery networks 106, one or more forward links 108, and one or more reverse links 110.

One or more of the vehicles 102 may be owned and/or operated by a specific individual. In some cases, one or more of the vehicles 102 may be owned and/or operated by a company, organization or government entity. For example, the vehicles 102 may include a fleet of vehicles that are used to transport passengers who pay for or otherwise are granted passage on one of the vehicles of the fleet. The vehicles 102 may include one or more vehicles that are used by an organization to transport employees and their guests, in some situations. One or more of the vehicles 102 may be used to transport live or inanimate cargo, packages, mail, and/or other types of cargo. It is noted that although FIG. 1 depicts the vehicles 102 as being airplanes, the techniques and principles described herein equally apply to other types of vehicles such as trucks, automobiles, busses, trains, boats, ships, barges, subway cars, helicopters or other types of aircraft, ambulances or other emergency vehicles, military vehicles, other air-borne, water-borne, or land-borne vehicles, and vehicles that are suitable for space travel.

Each of the vehicles 102 may be communicatively connected to the data center 105 via one or more forward wireless communication links 108 and one or more reverse wireless communication links 110. The links 108, 110 may be collectively supported by a multiplicity of radio frequency (RF) bands. Typically, a particular frequency band or portion of RF spectrum supporting the links 108, 110 is allocated (e.g., by a governmental or regulatory body) for a particular type of wireless communications such as satellite communications, communications, terrestrial cellular communications, near-field wireless communications, ham-radio, and the like. In some allocated frequency bands, the wireless communications may be transmitted over a forward link and a corresponding reverse link using a respective wireless communication protocol that is defined, designated or otherwise indicated by a standards association and/or by a government or other regulatory body. A particular frequency band may support a point-to-point wireless protocol and/or may support a broadband wireless protocol, for example.

Each frequency band may include one or more channels. The channels may be formed, defined or allocated by frequency division, time division, code division, some other suitable channel division, or some combination of divisions. Signals that are carried on a channel may or may not be multiplexed. Any one or more channels included in a frequency band may support (or may be designated to support) a forward link and/or a reverse link for wireless communications. Additionally, any one or more of the channels included in a frequency band may be used to deliver signaling, data payload, or a combination of signaling and data payload. For example, a particular frequency band may support an in-band protocol in which signaling and payload are transmitted over a same channel within the band, and/or the particular frequency band may support an out-of-band protocol in which the signaling and payload are respectively transmitted over different channels within the band.

A transceiver or modem that is fixedly connected to a vehicle 102x may be tuned to a particular frequency band, and thus, along with a respective antenna, may serve as one end of a communication link over which data may be received onto and/or sent from the vehicle 102x. Similarly, a transceiver or modem that is fixedly connected to a structure 112 external to the vehicle 102x may also be tuned to the particular frequency band, and thus, along with a respective antenna, may serve as the other end of the communication link over which the data is received onto and/or sent from the vehicle 102x. The structure 112 that supports the non-vehicle end of the communication link may be, for example, an entirely stationary terrestrial structure such as a building or tower on the ground, a relatively stationary terrestrial structure such as a barge in an ocean, or a non-terrestrial structure such as a satellite or other structure in space. In FIG. 1, the representations of the structures 112 are duplicated to more clearly illustrate the forward links 108 and reverse links 110, however, in practice, each structure 112 may be a unitary structure having a single physical transceiver or modem mounted thereon that services both the respective forward link 108 and the respective reverse link 110. For example, a teleport 112b may include a transceiver that services both the satellite forward link 108b and the satellite reverse link 110b of a particular frequency band allocated for satellite communications. In some instances, a single structure 112 may include multiple transceivers or modems, each of which may be tuned to a different frequency band.

With further regard to the structures 112, in addition to having a transceiver or modem supporting one end of a particular communication link 108, 110 to the vehicle 102x, each structure 112 may include another interface via which a communication path 115 to the hybrid communications distributor 104 at the data center 105 may be communicatively connected. The interface to the communication path 115 may be a wired or a wireless communications interface.

A vehicle 102x may include one or more fixedly connected modems or transceivers to support one or more communication links 108, 110 over one or more frequency bands, and the vehicle 102x may utilize these modems or transceivers to receive data onto the vehicle 102x and/or to transmit data from the vehicle 102x. For example, a vehicle 102x may include thereon a transceiver or modem tuned to a frequency band that is allocated for direct communications between vehicles 102 and ground stations, or on which a direct air-to-ground (ATG) communication link is supported (e.g., 849-851 MHz and 894-896 MHz). Such an ATG communication link is denoted in FIG. 1 by the forward link 108a and the reverse link 110a. A vehicle 102x may additionally or alternatively include thereon a transceiver or modem tuned to a frequency band that is allocated for satellite communications (denoted in FIG. 1 by the forward link 108b and the reverse link 110b), such as the L band (e.g., 40 to 60 GHz or 1 to 2 GHz), the $K_u$ band (e.g., 12-18 GHz), the $K_a$ band (e.g., 26.5-40 GHz), and/or other spectrum that is allocated for satellite communications.

Other examples of communication links that may be established with the vehicle 102x include terrestrial mobile or cellular communication links (denoted in FIG. 1 by the references 108c/110c), e.g., communication links that support TDMA (Time Division Multiple Access), GSM (Global System for Mobile Communications), CDMA (Code Division Multiple Access), Wi-MAX (Worldwide Interoperability for Microwave Access), LTE (Long Term Evolution), and/or other terrestrial mobile communications technologies. Yet another example of a type of communication link that may be established with the vehicle 102x is wireless local area network (WLAN) or Wi-Fi™ link supported on a Wi-Fi allocated frequency band (e.g., 2.4 and/or 5 GHz), and using a protocol corresponding to an IEEE (Institute of Electrical and Electronics Engineers) 802.11 standard, as denoted in FIG. 1 by reference 108c for a Wi-Fi forward link and reference 110c for a Wi-Fi reverse link. It is clear, however, that any suitable wireless communication link including a forward and/or reverse link may support communications between the data center 105 or the hybrid communications distributor 104 and a vehicle 102x.

In an embodiment, one or more of the transceivers or modems fixedly connected to the vehicle 102x may be operated in a unidirectional mode, while one or more other transceivers or modems fixedly connected to the vehicle 102x may be operated in a bi-directional mode. For example, a transceiver or modem on the vehicle 102x that is tuned to a satellite communications spectrum may be utilized in a receive-only mode, while another transceiver or modem on the vehicle 102x that is tuned to an ATG communications spectrum may be utilized in both receive and transmit modes.

The data center 105 may include, in an implementation, the hybrid communications distributor 104 and a hybrid proxy 107 as a set of computer executable instructions that are stored on one or more non-transitory, tangible computer-readable storage media (e.g., one or more memories or data storage entities), and that are executable by one or more processors of the data center 105. (The data center 105 generally includes one or more computing devices having processors, and is described in more detail in a later section of the present disclosure.) The hybrid communications distributor 104 may manage data or information delivery, e.g., over the links 108 and 110, to and from a device 118 that is being transported by a vehicle 102x. The hybrid proxy 107 may forward requests for content, information, or data to a web server 109 or other content provider, insert information in or otherwise modify responses from the web server 109, and/or generate additional information (e.g., Hybrid Cache Indices) corresponding to requests for content.

The device 118 may be a device that is fixedly connected to the vehicle 102x (e.g., a computing device that is included in a Line Replaceable Unit (LRU) on an aircraft), or the device may be a mobile device such as a smart phone, tablet or laptop that is temporarily being transported by the vehicle, e.g., a mobile computing device belonging to a passenger on-board the vehicle. In an embodiment, the device 118 is a computing device including at least one memory and at least one processor, and optionally, at least one user interface and at least one wireless network interface. As used herein, the terms "target device," "recipient device," "requesting device," and "device" are used interchangeably to refer to a device 118 that is on-board a vehicle or being transported by the vehicle, and to which data that is external to the vehicle is to be electronically delivered.

The data that is to be delivered to the device 118 may include any type of data. For example, the data may include user-consumable content data such as a text message, a web page, a media file, streaming data, and/or a response to a previous request received at a user interface of the device 118. In some cases, the data that is to be delivered to the device 118 includes data that is to be presented at a user interface of the device 118. In some scenarios, the data that is to be delivered to the device 118 may be an application, a configuration, an update, or software that the user of the device 118 has requested to be downloaded.

In an embodiment, the hybrid communications distributor 104 may select one of the forward links 108 that are supported by respective one or more allocated frequency bands for delivery of data or information to the device 118, and the hybrid communications distributor 104 may receive feedback data or information from the vehicle 102x over a reverse link 110 supported by a different allocated frequency band. For example, the hybrid communications distributor 104 may select, from the links 108, one particular forward link that is supported by a particular frequency band for forward data delivery to the device 118, e.g., the satellite communications forward link 108b. The hybrid communications distributor 104 may receive feedback information from the vehicle 102x via a particular reverse link, from the links 110, that is supported by a frequency band other than the particular frequency band over which the forward data was delivered, e.g., the ATG reverse link 110a. In some embodiments, the particular reverse link may be selected from the set of reverse links 110. Accordingly, in this embodiment, a forward link and a reverse link of different frequency bands are paired or associated for data delivery purposes.

At least because forward links and reverse links may be supported by different frequency bands, as discussed in the above embodiment, a different messaging protocol and/or delivery scheme (e.g., multicast, unicast) may be used for sending information to the vehicles 102 than is used for receiving feedback information from the vehicles 102. For instance, a broadband protocol may be utilized to deliver data over a selected forward link 108b, and a point-to-point protocol may be utilized to deliver data over a reverse link 108a. Additionally or alternatively, the hybrid communications distributor 104 may cause transmissions to be multicast over a forward link 108b, and may receive feedback information over a reverse link 108a in a unicast format. Such differing frequency bands, messaging protocols, and/or delivery schemes across the forward links 108 and the reverse links 108 and the selection(s) thereof may allow the hybrid communications system 100 to efficiently utilize available spectrum while, at the same time, adhering to existing modem constraints and/or regulatory requirements.

In an embodiment, the hybrid communications distributor 104 may select more than one forward link from the links 108 (each of which may be supported by a different frequency band) for distributed or hybrid delivery of data or information that is to be received, as a whole, at the device 118 on-board the vehicle 102x. For instance, the hybrid communications distributor 104 may select both the satellite communications forward link 108b and the ATG forward link 108a to deliver forward data, as a whole, to the device 118, and a first portion of the data may be delivered using the satellite forward link 108b while a second portion of the data may be delivered using the ATG forward link 108a. In some cases, more than two forward links 108 may be selected for distributed data delivery to the vehicle 102x. In this example, the hybrid communications distributor 104 may receive feedback information from the vehicle 102x via a reverse link that is included in the same frequency band as one of the selected forward links, e.g., the satellite communications reverse link 110b or the ATG reverse link 110a. Alternatively, the hybrid communications distributor 104 may receive feedback information from the vehicle 102x via a reverse link that is not included in the same frequency band as any of the selected forward links, e.g., the reverse link 110c.

Thus, in view of the above, in general the hybrid communications distributor 104 may utilize any suitable combination of selected forward links 108, reverse links 110, messaging protocols, and/or delivery schemes to transmit data to and receive feedback information from the vehicles 102 in a distributed or hybrid manner. The hybrid communications distributor 104 and its selection and usage of the one or more forward link(s) 108 and the reverse link(s) 110, messaging protocols, and/or delivery schemes for data delivery between the hybrid communications distributor 104 and the on-board devices 118 is discussed in more detail in later sections of this disclosure.

Turning now to the vehicles 102, some or all of the vehicles 102 (e.g., the vehicle 102x) may each include a respective on-board node 120 to manage data that is received onto the vehicle 102x and that is intended for delivery to a particular on-board device 118. The on-board node 120 may also manage data that is generated by the on-board devices 118 and that is to be transmitted from the vehicle 102x, in an implementation. Further, within the vehicle 102x itself, the on-board node 120 may manage communications of said data to and from the on-board devices 118, e.g., by using one or more communication networks that are contained within the vehicle 102x. In an embodiment, the on-board node 120 may include one or more computing devices that are communicatively connected to one or more transceivers or modems fixedly connected to the vehicle 102x, and are also communicatively connected to one or more wired and/or wireless communication networks contained within the vehicle 102x. In an embodiment, the on-board node 120 is included in an on-board data distribution system or device such as the data distribution device described in aforementioned co-pending U.S. patent application Ser. No. 13/675,200 entitled "VEHICLE DATA DISTRIBUTION SYSTEM AND METHOD."

In some cases, the on-board node 120 may include a hybrid communications collector 122. In an embodiment, the hybrid communications collector may comprise a set of computer executable instructions that are stored on a non-transitory, tangible computer-readable storage media (e.g., a memory) and are executable by one or more processors of the on-board node 120. The hybrid communications collector 122 may receive, via one or more of the forward links 108 and respective modem(s), communications that are provided by the hybrid communications distributor 104 whose contents are intended for delivery to a particular on-board device 118. The hybrid communications collector 122 may determine the recipient device 118, and may cause the contents of the received communications to be delivered via one or more on-board networks to the recipient device 118. Additionally, the hybrid communications collector 122 may cause feedback data or information to be transmitted via one or more reverse links 110 and their respective modem(s) for delivery to the hybrid communications distributor 104. The feedback data or information may include, for example, data or information associated with any one or more communications previously received over one or more of the forward links 108, data or information indicative of a state or condition of any one or more of the forward links 108, and/or data or information indicative of a state or condition of any one or more of the reverse links 110.

Further, the on-board node 120 may include a hybrid cache 123. As with the hybrid communications collector 122, the hybrid cache 123 may include a set of computer executable instructions that are stored on a non-transitory, tangible computer-readable storage media (e.g., a memory) and are executable by one or more processors of the on-board node 120. Also, the hybrid cache 123 may communicate with or include one or more databases or data structures configured to store content, data or information, where the content, data, or information is to be delivered to mobile computing devices on-board the vehicle 102x. As further discussed with reference to FIGS. 3 and 4, the hybrid cache 123 may, upon receiving responses to requests for content (e.g., from the data center 105), forward the content to requesting devices on-board the vehicle 102x and/or store portions of content requested by device on-board other of the vehicles 102. The hybrid cache 123 may also generate Hybrid Caches Indices (HCIs) allowing the on-board node 120 to associate requests for content with corresponding responses. For example, the hybrid cache 123 may generate a HCI based on an HTTP GET request, store data indicative of the HCI and/or HTTP GET request in a database, and update the data indicative of the HCI upon receiving a response corresponding to the HTTP GET request.

Turning now to the vehicle data delivery network 106, in an embodiment, at least a portion of the vehicle data delivery network 106 may be disposed in a terrestrial location, e.g., a packet network router, an optical switch, etc. may be located within a climate-controlled structure on the ground. In an embodiment, at least a portion of the vehicle data delivery network 106 may be disposed in a non-terrestrial location, e.g., a routing node may be disposed on a satellite or aircraft. The vehicle data delivery network 106 may include a public network, a private network, or some combination of one or more public networks and one or more private networks. The vehicle data delivery network 106 may include a communications network, a data network, a packet network, or some combination thereof. The vehicle data delivery network 106 may include a hosted network, or may be a peer-to-peer or other type of ad-hoc network. Indeed, the vehicle data delivery network 106 may use any known networking technology or combination(s) thereof for delivering data. For example, the vehicle data delivery network 106 may use any known networking technology or combination(s) thereof for delivering data between the one or more structures 112 and the data center 105 or the hybrid communications distributor 104 at the data center 105. Generally, the vehicle data delivery network 106 may include a plurality of computing devices that are communicatively connected. One or more portions of the vehicle data delivery network 106 may be included in the ground based system described in the aforementioned co-pending U.S. patent application Ser. No. 13/675,190 entitled "GROUND SYSTEM FOR VEHICLE DATA DISTRIBUTION," in an embodiment.

The data center 105 may be communicatively connected to the vehicle data delivery network 106, and may include one or more computing devices in communicative connection so that they collectively appear, to other networks and/or computing devices, as a single logical entity. In an embodiment, the data center 105 includes the hybrid communications distributor 104. The data center 105 may be located at least partially in a terrestrial environment, e.g., in one or more stationary buildings or structures. For example, one or more portions of the data center 105 may be included in a ground distribution network, such as the ground distribution network described in aforementioned co-pending U.S. patent application Ser. No. 13/675,190. In an embodiment, at least a portion of the data center 105 may be located in a non-terrestrial environment, e.g., on an aircraft, satellite, or space station. It is clear, however, that the data center 105 may be located in any suitable environment, whether stationary, mobile, in a vehicle, terrestrial, or non-terrestrial. In an embodiment, multiple data centers 105 may be included in the hybrid communications system 100 for servicing different types of data, different customers, different geographical areas, or any other desired or suitable differentiations.

The data center 105, and in particular, the hybrid communications distributor 104 and hybrid proxy 107 included in the data center 105, may be communicatively connected via one or more gateways 130 to one or more other networks 132. Generally, a gateway 130 may include one or more computing devices in communicative connection, and may serve as a boundary between the hybrid communications system 100 and one or more other networks 132. In some embodiments, at least some of the computing devices included in the gateway 130 may also be included in the data center 105. The one or more other networks 132 in communicative connection with the gateway 130 may include, for example, the Internet, a PSTN (Public Switched Telephone Network), and/or some other public network. Additionally or alternatively, the one or more other networks 132 may include one or more private networks. The one or more networks 132 may include any number of wired and/or wireless networks. Although FIG. 1 illustrates the data center 105 being connected to one other network 132 via one gateway 130, the techniques and principles described herein equally apply to hybrid communications systems 100 having and/or being in communicative connection with any desired number of other networks 132 via any number of gateways 130. In some embodiments of the system 100, the gateway 130 may be omitted.

In an embodiment, the other network 132 may provide data, e.g., via the gateway 130 or via a direct connection, that is to be delivered to a particular device 118 that is on-board a vehicle 102x. In an example, the other network 132 is the PSTN communicatively connected to a terrestrial, cellular network to which the device 118 is homed, and the data to be delivered to the device 118 is a text message or a voice mail forwarded by the home system. In another example, the other network 132 is communicatively connected, via a gateway 130, to one or more computing devices, such as the web server 109, that host a website which a user of the device 118 requests access, and information associated with the website (e.g., the web page, objects, and links thereon) is to be delivered to the device 118 for presentation on a user interface of the device 118 in response to the user request. In yet another example, the other network 132 is communicatively connected to a streaming media provider, and a streamed video file is the data is to be delivered to the on-board device 118 for consumption by the device's user at a user interface. Of course, any type of data may be provided to the data center 105 by any other network 132 or content provider (via the gateway 130, if necessary) for delivery to an indicated device 118 on-board the vehicle 102x, e.g., text messages, web pages, media content, streaming data, a response to a previous request received at a user interface of the device 118, data that is to be presented at a user interface of the device 118, an application, a configuration, or other software that the user of the device 118 has requested to be downloaded from the other network 132. Additionally, return data or information from the on-board device 118 (e.g., an activation of a user control, a return text message, a request or command, etc.) that is received at the hybrid communications distributor 104 may be delivered (via the gateway 130, if necessary) to the other network 132.

In an embodiment, the forward link may be selected additionally or alternatively based on a type of content that is included in the subsequent forward transmission. For example, a first forward transmission may include a text message that is to be delivered to the device 118, whereas a forward transmission may include streaming media content that is to be delivered to another device on-board the vehicle 102x. In this example, the hybrid communications distributor 104 may select an ATG forward link 108a to deliver the text message (e.g., if the ATG forward link 108a currently has sufficient spare bandwidth to support the relatively small text message), and the hybrid communications distributor 104 may select the satellite forward link 108b to deliver streaming media content, as the satellite forward link 108b may be a broadband connection link having a greater bandwidth or speed than that of the ATG forward link 108a, which may better support the relatively larger media content. For example, the bandwidth or speed of the satellite forward link 108b may be two times greater than that of the ATG forward link 108a, three times greater, four times greater, five times greater, six times greater, seven times greater, or greater by a factor larger than seven.

On-Board System

Figure 2:
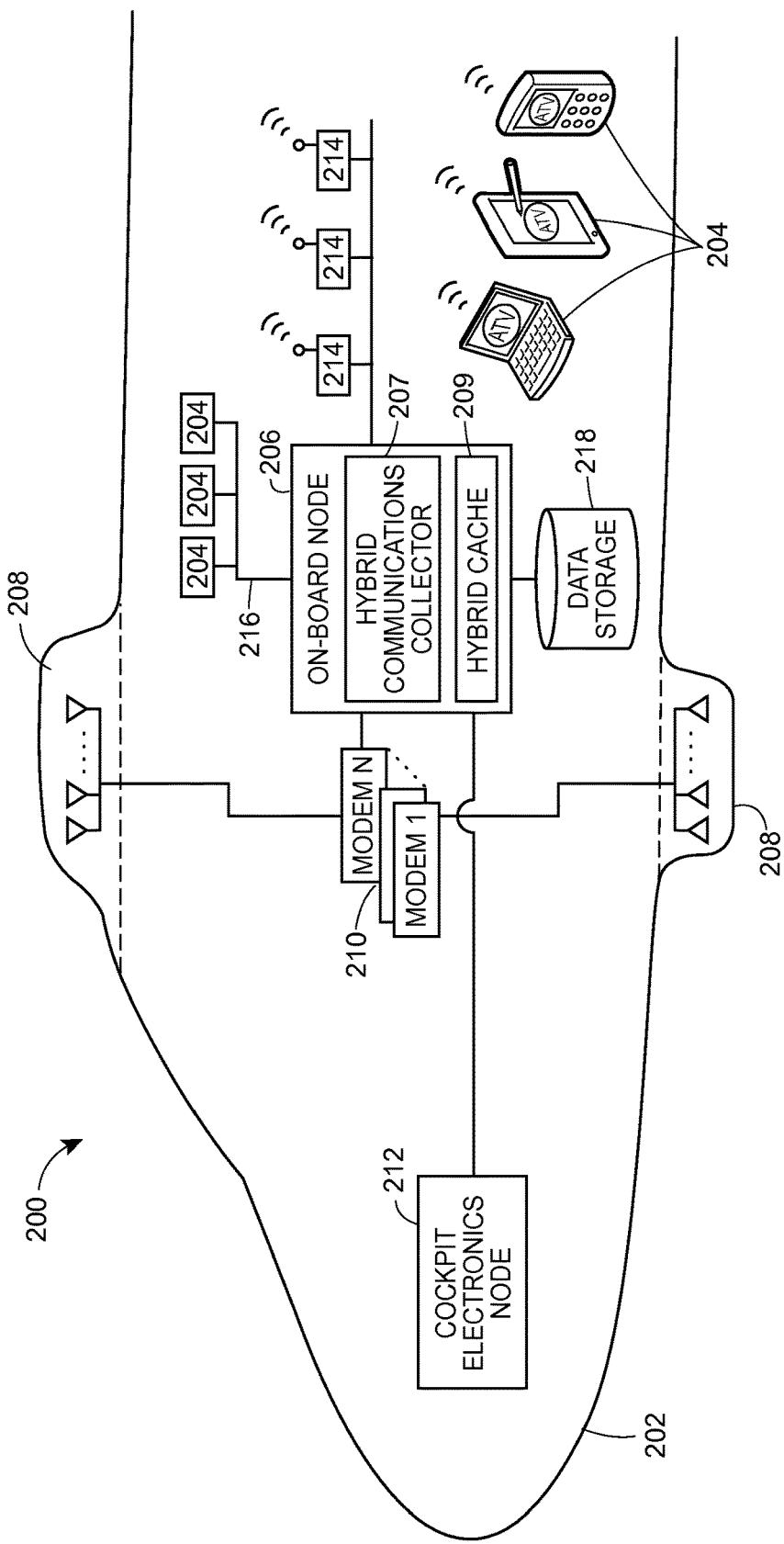
FIG. 2 is a block diagram of an example system contained within a vehicle that is configured to receive hybrid communications or data onto the vehicle and cache at least some of the received information or data.

FIG. 2 illustrates an example on-board system 200 in a vehicle 202 that may receive information or data onto the vehicle 202 (e.g., information or data provided by the data center, the hybrid communications distributor 104, or other suitable information distributor), that may cache the information or data, and that may cause feedback information to be delivered from the vehicle 202, e.g., to the data center 105 or the hybrid communications distributor 104. Further, the on-board system 200 may cause data to be delivered to and/or received from one or more devices 204 being transported by the vehicle 202. In an embodiment, the vehicle 202 is the vehicle 102x, and the one or more devices 204 is one of the devices 118.

Figure 9:
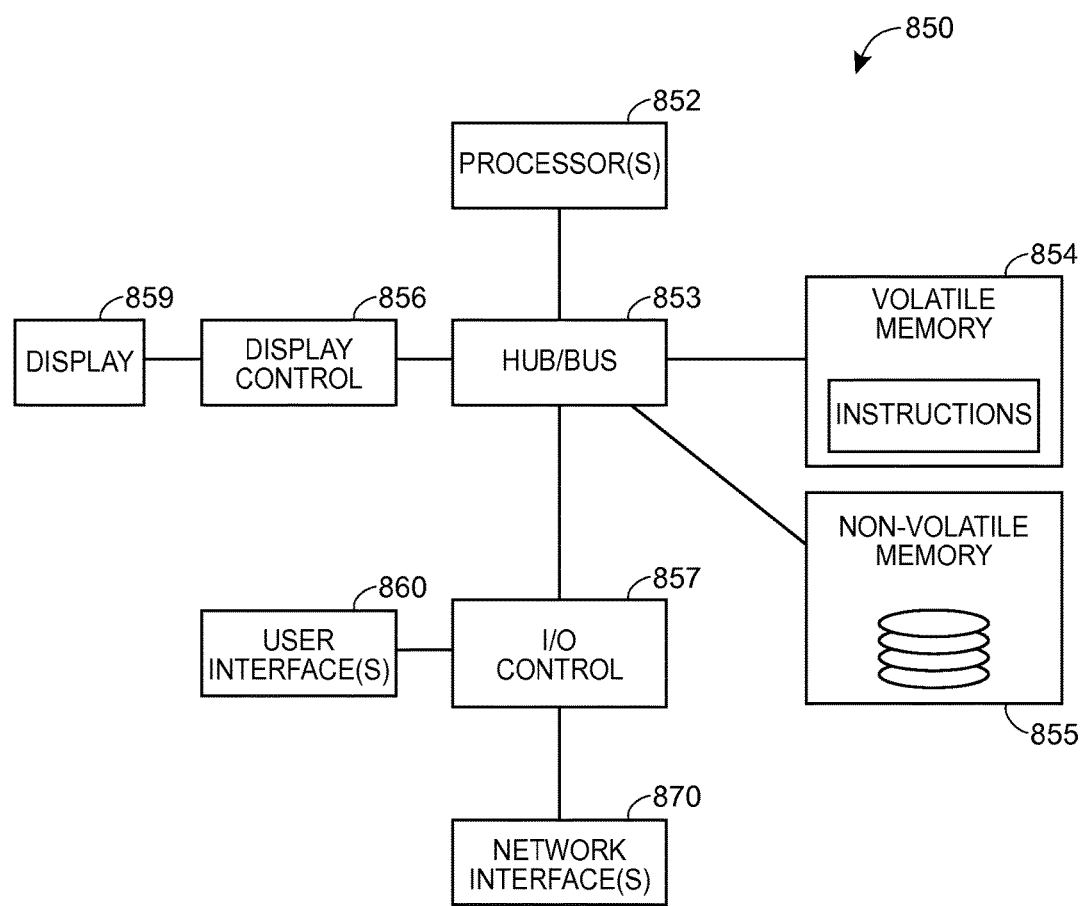
FIG. 9 is a block diagram of an example computing device that may be utilized in a hybrid communications system, such as the system illustrated in FIG. 1.

The example on-board system 200 includes an on-board node 206, such as an Auxiliary Computer Power Unit (ACPU), that may be a computing device communicatively connected to one or more external communication links via one or more antennas 208 and one or more modems or transceivers 210. In an embodiment, the on-board node 206 may be the on-board node 120, and may include an instance of the hybrid communications collector 122 and the hybrid cache 123, which are represented in FIG. 9 by the blocks 207 and 209, respectively.

Each of the one or more antennas 208 may receive and transmit signals via a different respective frequency band allocated for wireless communications, e.g., the $K_a$ band, the L band, the $K_u$ band, the WiMAX band, the Wi-Fi band, a terrestrial cellular band, or any other suitable wireless communication frequency band. Each of the antennas 208 may be communicatively connected to an associated modem or transceiver 210 that is fixedly connected to the vehicle 202 and is configured to encode and decode information and data corresponding to signals at the respective antenna 208, in an implementation. The one or more modems or transceivers 210 may include a respective modem or transceiver that is compatible with TDMA (Time Division Multiple Access), GSM (Global System for Mobile Communications), CDMA (Code Division Multiple Access), LTE (Long Term Evolution) communications, WiMAX, and/or any other terrestrial mobile communications technology. In some embodiments, the one or more modems 210 may include a respective modem or transceiver that is compatible with EVDO (Evolution Data Optimized) or Wi-Fi communications technologies. It is clear, however, that the on-board system 200 may include any number of antennas 208 and any different number of associated modems or transceivers 210 to support any desired number of different wireless communication technologies.

In addition, when the vehicle 202 is an aircraft, a cockpit electronics node 212 may be communicatively coupled to the one or more modems 210. The cockpit electronics node 210 may be a LRU configured to collect electronic information from various instruments in the cockpit of the aircraft, e.g., during flight. In some cases, the cockpit electronics node 210 may provide collected flight information such as altitude, airspeed, aircraft position, or other flight state information to the hybrid communications collector 207, the on-board node 206, or directly to the vehicle data distribution network 106, e.g., via a designated return link.

At least some of the devices 204 may be mobile computing devices such as smartphones, tablet computers, laptop computers, personal digital assistants, e-readers, etc. that are capable of establishing a wireless communicative connection with the hybrid communications collector 207 via one or more wireless access points 214, e.g., via a wireless network interface. Some of the devices 204 may be wired computing devices that are communicatively connected to the on-board node 206 via a wired network 216.

In some implementations, one or more of the devices 204 may be an on-board data storage entity 218 that may store various types of data which may be distributed to and/or received from other devices 204, e.g., entertainment content, web pages, account information, usage data, applications that may be installed, information identifying the devices 204, payment information (e.g., encrypted financial account information), digital rights management (DRM) keys, and/ or any other data that is desired to be stored, at least temporarily, on-board the vehicle 202. The on-board data storage entity 218 may further store indices or other information related to the caching of data on-board the vehicle 202. For example, the on-board data storage entity 218 may store Hybrid Cache Indices (HCIs) and corresponding HTTP requests/responses, as further discussed with reference to FIGS. 3 and 4.

In an embodiment, each of devices 204 may include an instance of a vehicle travel application (VTA) installed thereon and particularly configured to support services while the respective device 204 is being transported by the vehicle 202, e.g., when the vehicle 202 is traveling en route between ports. For example, the vehicle travel application may be configured to serve as the on-board end of a data tunnel that is established with the data center 105 or with the hybrid communications distributor 104 at the data center. In an embodiment, the vehicle travel application may communicate with other applications installed on a particular device 204 (e.g., native terrestrial applications) so that the other applications may operate as desired (e.g., in a native manner) while the device 204 is being transported by the vehicle 202.

Data Caching

As described above, the hybrid communications distributor 104 may communicate with the vehicles 102 on a forward link via multicast. That is, a plurality of on-board nodes in a plurality of respective vehicles may receive a message (e.g., including content, data, or information) on the forward link, where at least some of the message is to be delivered to a mobile computing device disposed in only one of the plurality of respective vehicles. Therefore, if an on-board node in one vehicle (transporting the requesting or recipient device) receives certain data, such as a movie, web page, etc., on a forward link multicast, all the other vehicles receiving the multicast also receive the certain data, even though the other vehicles are not transporting the requesting device.

The data caching methods discussed below allow some or all of the requested content to be utilized by one or more non-requesting client devices in a plurality of vehicles, even though the non-requesting client devices may not have/know the request for the content. Data caching is illustrated below with an emphasis on hypertext transfer protocol (HTTP) data. However, it is understood that the methods may be applied to any other non-encrypted data and other protocols including proprietary protocols or message structures. Further, although certain features and steps of example data caching methods are outlined below, it is understood that a data caching method may include any suitable combination or arrangement of the features and steps.

Figure 3:
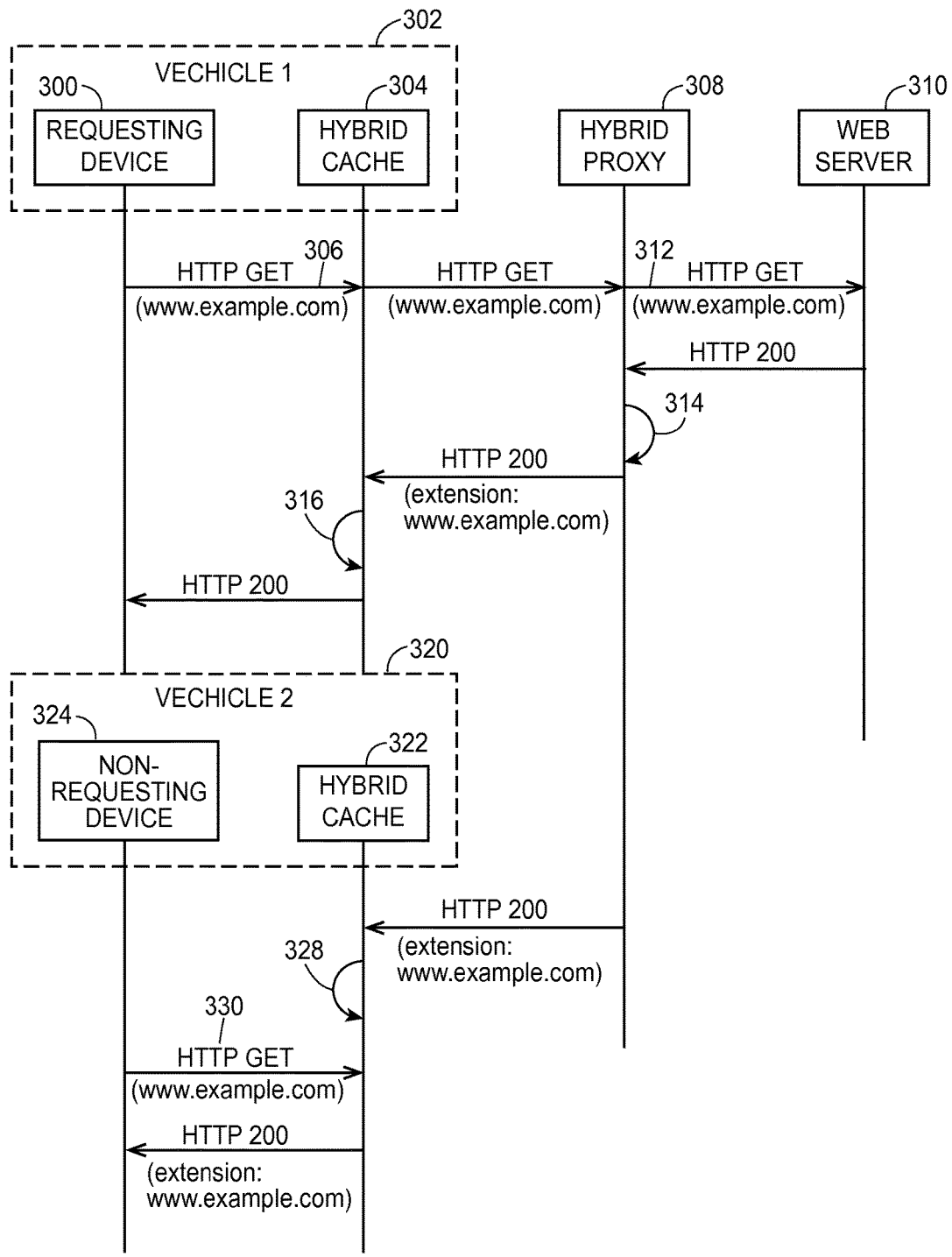
FIG. 3 is a call flow which illustrates an example data caching method which can be implemented in a hybrid communication system, such as the system illustrated in FIG. 1.

FIG. 3 illustrates a flow of communications to and from a plurality of vehicles, such as aircraft, according to one embodiment of data caching. The communications illustrated in FIG. 3 may be implemented in a hybrid communications system, such as the system 100 illustrated in FIG. 1. Client devices, hybrid caches, hybrid proxies, and web servers are illustrated in FIG. 3, but it is understood that communications between such devices may also include communications with any number of intermediary devices, networks, or systems.

A requesting device 300 in a first vehicle 302 may send a request for content to a hybrid cache 304, where the hybrid cache 304 is also be disposed in the first vehicle 302 (e.g., within an ACPU). The request may include a request according to an HTTP GET method, for example, indicating a universal resource locator (URL) for a web page (as illustrated by the arrow 306). In general, a request from the requesting device 300 may include indications of any suitable type of content, such as web pages, mobile application content, pictures, music, movies, etc.

The hybrid cache 304 may forward the HTTP GET request to a terrestrial hybrid proxy 308, in the implementation. The cache may forward the request via a selected reverse link, for example, as discussed further with reference to FIGS. 1 and 2. In some implementations, the hybrid cache 304 and/or other on-board computing devices (not shown) may modify or encode the HTTP GET request such that it may be forwarded to the hybrid proxy 308. For examples, the modem or transceiver 210 may encode and the HTTP GET request at the respective antenna 208. The encoding may facilitate a communication that is compatible with TDMA, GSM, CDMA, LTE, etc.

The hybrid proxy 308, located at a terrestrial location, may receive such encoded, or otherwise communicated, HTTP GET requests from the first vehicle 302. Upon receiving a request, the hybrid proxy 308 and/or other terrestrial computing devices (e.g., in the data center 105) may decode the HTTP GET request and forward the request to a web server 310 (as indicated by arrow 312). The web server 310 may be accessible to the hybrid proxy 308 via a combination of private and public networks. Further, the web server 310 may include any suitable type and or number of servers or systems configured as content providers, where the content providers service requests for content from devices over the public and/or private networks.

In response to the receipt of an HTTP GET request from the hybrid proxy 308, the web server 310 may send an HTTP 200 response back to the hybrid proxy 308, where the HTTP 200 response includes the content requested by the requesting device 300. The web server 310 may, for example, send back a response including a message, such as "HTTP/1.1 200 OK", and the requested content. It is clear, however, that a response from the web server 310 may include an error message and/or other information depending on utilized protocols.

In an implementation, the hybrid proxy 308 inserts requests (e.g., an HTTP GET request with a URL, http:// www.example.com) in a "HYBRID CACHING HEADER" tag, such as an extension header on a HTTP 200 response, to generate a modified message. The hybrid proxy 308 may insert the HYBRID CACHING HEADER on the ground, or at any suitable mobile location, via a web-proxy server specially configured to manage data communications in the hybrid communications system. Although one URL may be inserted in the HYBRID CACHING HEADER, it is understood that any number (one, two, three, etc.) of URLs may be placed within an HTTP 200 response by the hybrid proxy 308 as an extension header. Further, the hybrid proxy 308 may insert an indication of "cacheable" content in a response from the web server 310. Cacheable content (e.g., content to be cached by one or more vehicles) may be defined according to HTTP directives, but, in general, could be defined in any suitable manner including a proprietary manner specific to one or more airlines, service providers, etc. FIG. 3 illustrates the inserting of a HYBRID CACHING HEADER, or other suitable modification of the response from the web server 310, via the arrow 314.

The hybrid proxy 308 may cause the modified response to be sent to the first vehicle 302. The communication of the modified response from the hybrid proxy 308 to the first vehicle 302 may occur on a selected forward link, as described with reference to FIGS. 1 and 2, and may involve any number of system, server, network, and other software/hardware components, such as the hybrid communications distributor 104. Moreover, the communication of the modified message to the first vehicle 302 over the forward link may be a multicast of the modified message (e.g., along with other data or information) to a plurality of vehicles which may be ingested (e.g., received and processed) by the plurality of vehicles, in an implementation. For example, the hybrid communications distributor 104 may multicast data or information including the modified message to a plurality of vehicles including the first vehicle 302 and a second vehicle 320. It is clear, however, that the modified message may be multicast to any number of vehicles, as described further with reference to FIG. 1.

Upon receipt of the modified message, the hybrid cache 304 and/or other computing devices in the first vehicle 302 (i.e., the vehicle 302 transporting the requesting device 300) may: (i) match the modified message with one or more requests for content from device on-board the first vehicle 302; (ii) place at least some of the modified message within one or more computer readable storage media, or caches (as illustrated by an arrow 326); (iii) forward content requested by the requesting device 300 to the requesting device 300; and (iv) drop (e.g., delete) content requested by devices being transported by other vehicles. For example, the hybrid cache 304 may cache, or store within a computer readable storage medium, HTTP content based on cache header/pragma settings and insertions (e.g., tags) in the modified message, where the insertions may be inserted in the modified message by the terrestrial hybrid proxy 308.

On the other hand, upon receipt of the modified message, a hybrid cache 322 and/or other computing devices in the second vehicle 320 (i.e., the vehicle 320 transporting a non-requesting device 324) may: (i) attempt to match the modified message with one or more responses for content from devices, such as the non-requesting device 324, being transported by the second vehicle 320 with the modified message; (ii) place at least part of the modified message within one or more computer readable storage media, or caches (as illustrated by an arrow 328); and (iii) drop (e.g., delete) content requested by devices being transported by other vehicles.

Because at least some of the modified message is cached on the vehicles 302 and 320, subsequent request for the content included in the modified message may be, at least partially, fulfilled by cached content. That is, when a subsequent request for the content in the modified message (e.g., identified by the URL http://www.example.com) is sent to the hybrid cache 322 (as illustrated by an arrow 330), the hybrid cache may attempt to fulfill, or respond to, the request by retrieving and forwarding content stored in one or more local storage media on the vehicle 302. Specifically, the hybrid cache 322 may retrieve at least some of the previously received and cached modified message (as illustrated by an arrow 328) and send the at least some of the modified message to the non-requesting device 324 without sending a request to the hybrid proxy 308 or web server 310.

Figure 4:
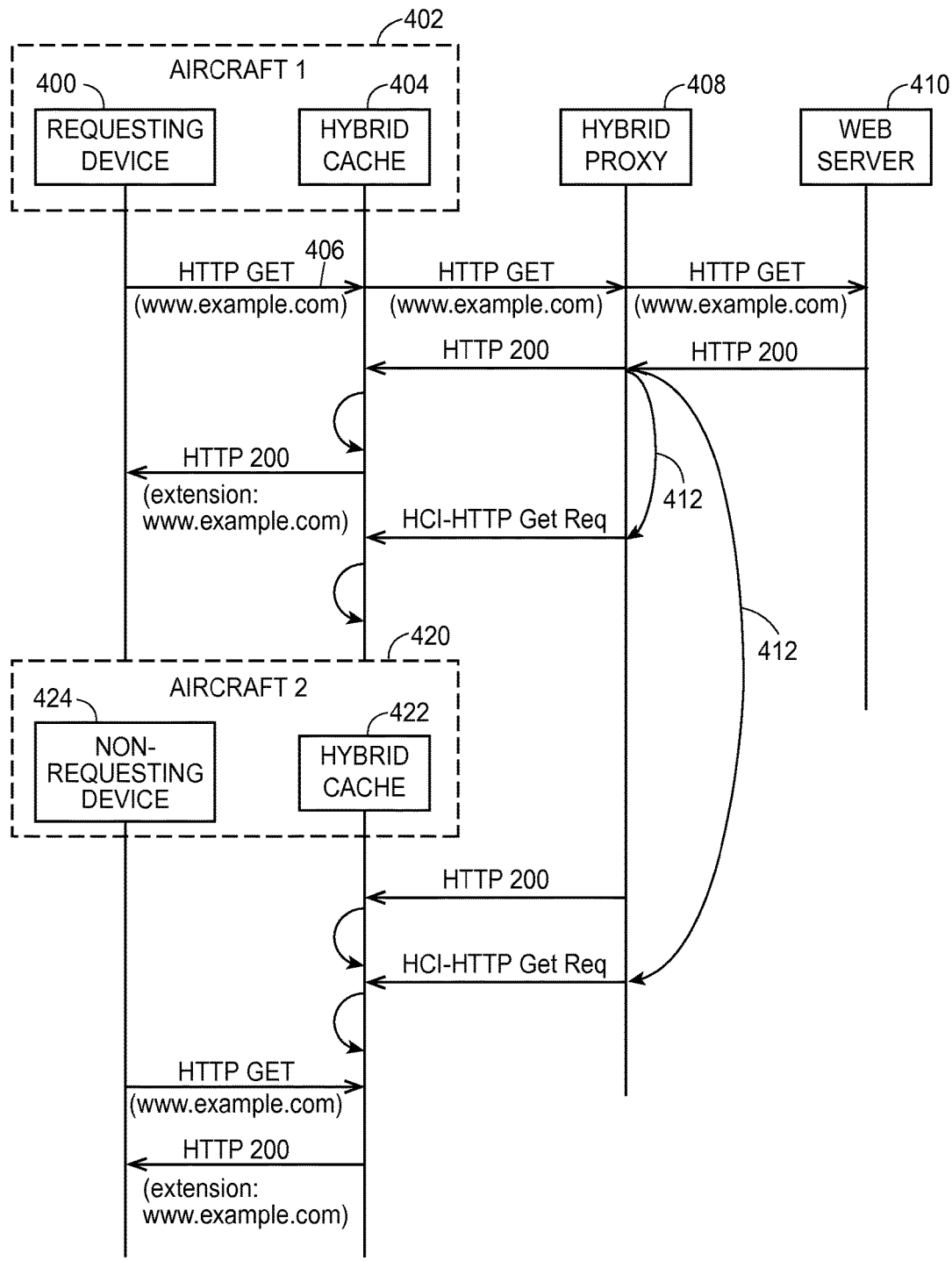
FIG. 4 is a call flow which illustrates another example data caching method which can be implemented in a hybrid communication system, such as the system illustrated in FIG. 1.

FIG. 4 illustrates a flow of communications to/from a plurality of vehicles according to another embodiment of data caching. As with the example flow of communication illustrated in FIG. 3, the communications illustrated in FIG. 4 may be implemented in a hybrid communications system, such as the system 100 illustrated in FIG. 1. Although, client devices, hybrid caches, hybrid proxies, and web servers are illustrated in FIG. 4, it is understood that communications between such devices may include communications with any number of intermediary devices, networks, or systems.

Similar to the flow of communications illustrated in FIG. 3, a requesting device 400 in a first vehicle 402 may send a request for content to a hybrid cache 404. The request may include a request according to an HTTP GET method, for example, indicating a URL (http://www.example.com) for a web page (as illustrated by the arrow 406). The hybrid cache 404 may forward the HTTP GET request to a terrestrial hybrid proxy 408, and, upon receiving a request, the hybrid proxy 408 may forward the request to a web server 410. The web server 410 may send an HTTP 200 response, or other suitable response, back to the hybrid proxy 408, and the HTTP 200 response may include the content requested by the requesting device 400.

In addition to forwarding the request for content (e.g., HTTP GET request) to a terrestrial hybrid proxy 408, the hybrid cache 404 may generate and store a Hybrid Cache Index (HCI) corresponding to the request. For example, the Hybrid Cache 404, or other on-board computing device, may utilize HCIs to associate a URL in the HTTP GET request to eventual HTTP 200 responses. The HCIs may be stored, along with the corresponding requests, in a database on-board the first vehicle 402, such as the on-board data storage entity 218.

The hybrid proxy 408, in an implementation, may also generate one or more pieces of information in response to receiving the HTTP 200 response from the web server 410. For example, the hybrid proxy 408 may also generate a Hybrid Cache Index (HCI) corresponding to the HTTP 200 response. The HCI may, in an implementation, be a string that is algorithmically constructed from the HTTP 200 response from the web server 410 or HTTP GET request from the requesting device 400 such that the hybrid proxy 408 and hybrid cache 404 can both generate the HCI. The hybrid proxy 408 may store the HCI in one or more computer readable media if directives (e.g., HTTP directives, such as MAXAGE, EXPIRES, etc.) in the HTTP 200 response state it should be retained, and the combination of the HCI, the original HTTP GET request (HGR), and the HTTP 200 response (H2R) is referred to below as the "Hybrid Triplet" (or HGR-HCI-H2R). The generation of the HCI in combination with the HGR is illustrated in FIG. 4 by one or more arrows 412.

The hybrid proxy 408 may cause the hybrid triplet to be sent to the first vehicle 402 and a plurality of other vehicles (e.g., including a second vehicle 420) via a multicast on a forward link, as further described with reference to FIGS. 1 and 2. Upon receipt of the hybrid triplet, the hybrid cache 404 and/or other computing devices in the first vehicle 402 may update the HCI entry in the on-board data storage entity 218 with the H2R response from the hybrid proxy 408. Likewise, hybrid caches in other vehicles, such as a hybrid cache 422 in a second vehicle 420, may update HCI entries in a database corresponding to missing information. The missing information may include any portion of the hybrid triplet. In fact, vehicles transporting non-requesting devices, such as a non-requesting device 424 in the second vehicle 420, may generate a new entry in a database corresponding to the entire hybrid triplet, because such vehicles may lack any information about a request for content from the requesting device 400. It is clear, however, that a hybrid cache may update any portion of the hybrid triplet stored in a database, such as the HGR, HCI, or H2R.

The hybrid cache 422 may receive subsequent requests from non-requesting devices, such as the non-requesting device 424. Subsequent requests may include requests for content included in a hybrid triplet, which was previously supplied by the hybrid proxy 408. In such cases, the hybrid cache 422 may query a database, such as the on-board data storage entity 218, for responses (e.g., H2Rs) matching the subsequent requests. For example, the hybrid cache 422 may query a database with entries corresponding to various HCIs, at least some of which correspond to content required to fulfill the subsequent requests. When matching content is returned from the query, the hybrid cache 422 causes the content to be sent to the non-requesting device 424. If no matching content is found in a query of the hybrid triplet storing database, the hybrid cache 422 may cause a subsequent request to be forwarded to a terrestrial hybrid proxy, such as the hybrid proxy 408.

In some implementations, including those discussed with reference to FIGS. 3 and 4, hybrid proxies, such as the hybrid proxies 107, 308, and 408, may process HTTP data (e.g., GET requests) directly or the hybrid proxies may utilize "mirror data." That is, hybrid proxy may analyze, modify, or otherwise utilize HTTP data retrieved from a mirroring system or server, rather than from client devices directly or from the vehicles transporting them. The response observed by a hybrid proxy may or may not be the same as the response observed by a hybrid cache. Further, in some implementations, such mirror data may be utilized after data has been optimized for improved user experience, network efficiency, scalability, or capacity.

Although FIG. 4 illustrates a method in which both a hybrid proxy and hybrid cache can generate and store HCI, HGR, and H2R information, it is understood that such records may be centrally located in one database or distributed across any number of computer readable storage media. For example, a hybrid cache may re-direct all HTTP GET requests to a terrestrial (e.g., not located on-board a corresponding vehicle) hybrid proxy which will return a "Hybrid Response Cache Index" (HRCI) to a vehicle if there is a cache entry in a local database on-board the corresponding vehicle. The hybrid cache in a vehicle may utilize this HRCI index to pull data from a local (e.g., on-board the vehicle) database, and, if not in the database, the hybrid cache may re-request the data. This example implementation may also include a "no-cache" setting in the request to force a re-request of the HTTP data.

It is noted that a hybrid cache or hybrid proxy may include any number of computing devices in series, in an implementation. However, multiple proxies, ACPUs, and/or caches may be integrated such that a hybrid cache and/or a hybrid proxy is dynamically added to another cache to reduce the proxy/cache count.

Figure 5:
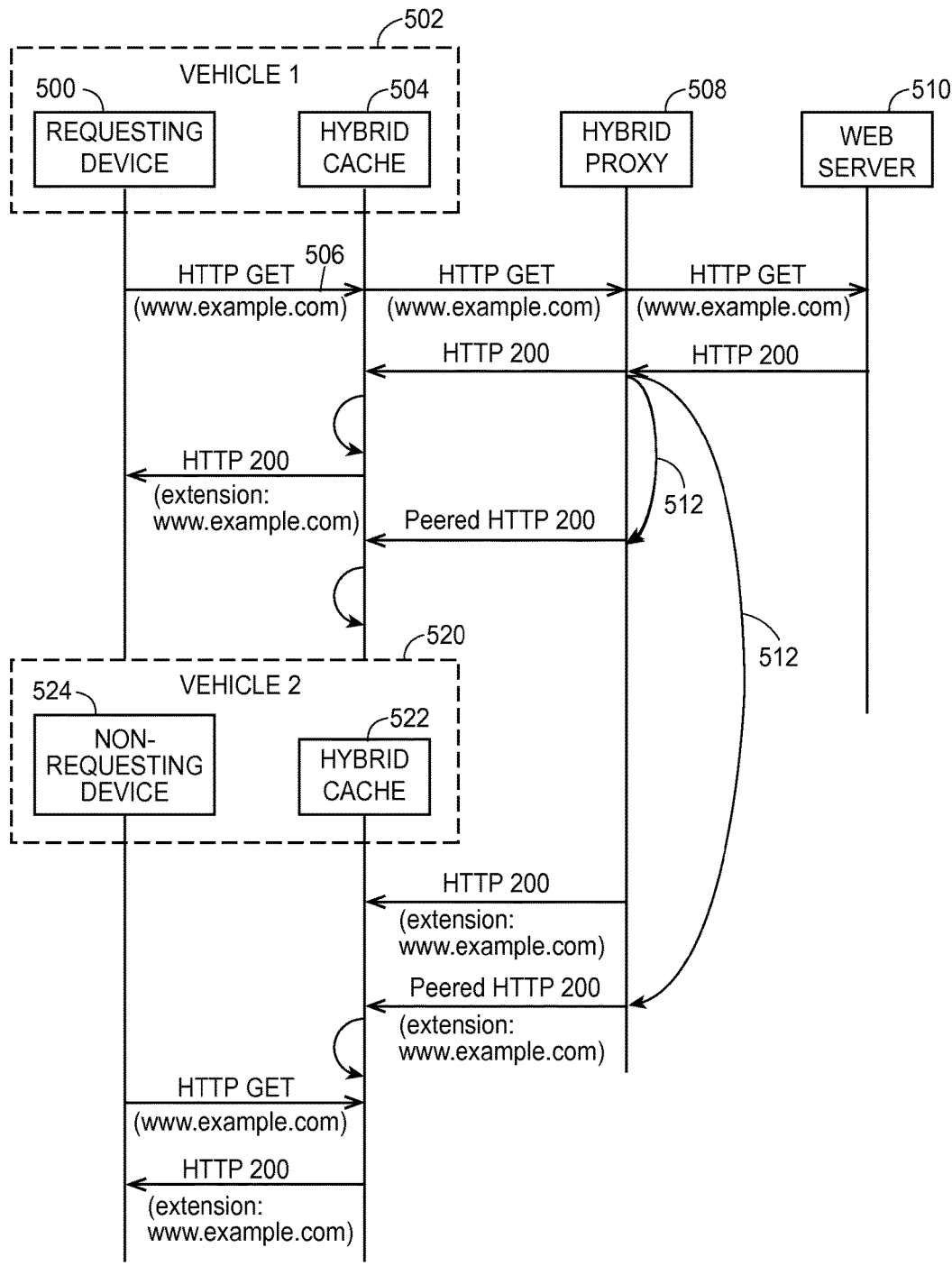
FIG. 5 is a call flow which illustrates yet another example data caching method which can be implemented in a hybrid communication system, such as the system illustrated in FIG. 1.

FIG. 5 illustrates a flow of communications to/from a plurality of vehicles according to yet another embodiment of data caching. As with the example flows of communication illustrated in FIG. 3 and FIG. 4, the communications illustrated in FIG. 5 may be implemented in a hybrid communications system, such as the system 100 illustrated in FIG. 1. Although, client devices, hybrid caches, hybrid proxies, and web servers are illustrated in FIG. 5, it is understood that communications between such devices may include communications with any number of intermediary devices, networks, or systems.

Similar to the flow of communications illustrated in FIG. 3 and FIG. 4, a requesting device 500 in a first vehicle 502 may send a request for content to a hybrid cache 504. The hybrid cache 504 may forward the HTTP GET request to a terrestrial hybrid proxy 508, and, upon receiving a request, the hybrid proxy 508 may forward the request to a web server 510. The web server 510 may send an HTTP 200 response, or other suitable response, back to the hybrid proxy 508 including the content requested by the requesting device 500.

The hybrid proxy 508 causes the a message including the HTTP 200 response to be sent to the first vehicle 502 over a forward link as a multicast to a plurality of vehicles, in an implementation. For example, the hybrid communications distributor 104 may multicast data or information including the HTTP 200 response to a plurality of vehicles including the first vehicle 502 and a second vehicle 520. It is clear, however, that the data or information may be multicast to any number of vehicles, as described further with reference to FIG. 1.

Upon receipt of the multicast data or information, the hybrid cache 504 and/or other computing devices in the first vehicle 502 (i.e., the vehicle 502 transporting the requesting device 500) may: (i) match the information or data (e.g., the HTTP 200 response) with one or more requests for content from devices on-board the first vehicle 502; (ii) forward content requested by the requesting device 500 to the requesting device 500; and (iv) drop (e.g., delete) content requested by devices being transported by other vehicles. On the other hand, upon receipt of the modified message, a hybrid cache 522 and/or other computing devices in the second vehicle 520 (i.e., the vehicle 520 transporting a non-requesting device 524) may: (i) attempt to match the multicast data or information with one or more responses for content from devices, such as the non-requesting device 524, being transported by the second vehicle 520 with the multicast data or information (e.g., the HTTP 200 response); and (iii) drop (e.g., delete) content requested by devices being transported by other vehicles.

In the implementation, the hybrid proxy 508 may also determine if some or all of the content included in the HTTP 200 response from the web server 510 is cacheable. If at least some of the content included in the HTTP 200 response is cacheable, the hybrid proxy may cause a second message (i.e., a message separate from the multicast data including the HTTP 200 response) to be generated and multicast to the plurality of vehicles including the first vehicle 502 and the second vehicle 520 (e.g., over a forward link). The second message, or "peered" HTTP 200 message, is generated according to a cache-peering mechanism for the purpose of caching the cacheable content on the plurality of vehicles.

Upon receipt of the peered HTTP 200 message, the hybrid cache 504 and hybrid cache 522 may: (i) determine if the content (e.g., the URL "www.example.com") in the message is cached in the respective hybrid cache; and (ii) if the content of the peered message is not cached, place at least part of the content in the peered HTTP 200 message within one or more computer readable storage media on-board the corresponding vehicle. In this manner, the hybrid caches of all of the plurality of vehicles to which the peered HTTP 200 message may be updated with the cacheable content determined by the hybrid proxy 508.

Figure 6:
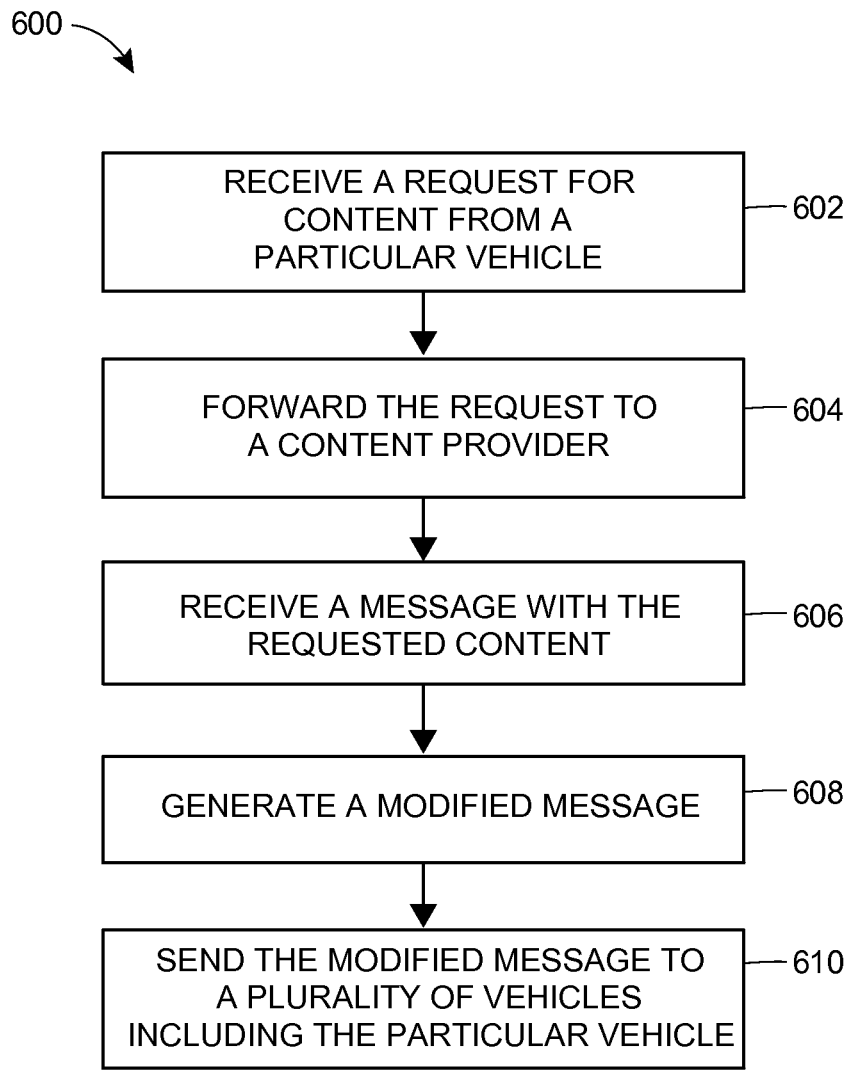
FIG. 6 is a flow diagram of an example method for managing communications with devices being transported by vehicles via data caching, where the method can be implemented in the system illustrated in FIG. 1.

FIG. 6 is a flow diagram of an example method 600 for managing communications with devices being transported by vehicles via data caching. The method 600 may be implemented in the hybrid proxy 107, for example. However, it is understood that any suitable combination of computing devices with any number of processors may implement the example method 600.

To begin, a request for content is received from a particular vehicle (block 602). The request may include an HTTP GET request specifying one or more URLs, for example. In an implementation, the request for content is received via a reverse link, as further discussed with reference to FIG. 1. The request may only specify requested content such as web pages, movies, music, videos, images, etc. However, in general the request (and corresponding responses) may be structured according to any number of HTTP methods, such as GET, HEAD, POST, PUT, DELETE, TRACE, OPTIONS, CONNECT, and PATCH, or the request may be structured according to any other suitable protocols, such as file transfer protocol (FTP), simple mail transfer protocol (SMTP), trivial file transfer protocol (TFTP), simple FTP (SFTP), network news transfer protocol (NNTP), secure shell (SSH), post office protocol version 3 (POP3), internet message access protocol version 4 (IMAP4), hypertext transfer protocol secure (HTTPS), etc.

In some implementations, the request may identify a requesting device being transported by the particular vehicle. For example, an HTTP GET request may include "User Agent" information identifying a web browser (or other application) type and operating system of the requesting device. Alternatively or additionally, the request may include an internet protocol (IP) address, a media access control (MAC) address, an IMEI number, or any other suitable identification of a mobile computing device.

Next, the request is forwarded to a content provider (block 604), such as a web server. For example, the hybrid proxy 107 may receive the request and forward the request to one or more web servers based on corresponding URLs included in the request. In response to forwarding the request to the content provider, a message, or response, is received including the requested content (block 606). If HTTP is being utilized as a protocol, the message may include an HTTP 200 response and a message body, where the message body includes the requested content or a coded, compressed, or otherwise represented version of the requested content. In general, the response may be structured in any suitable manner, and the response may indicate any number of indications of response status, such as informational indications (continue, switching protocols, etc.), success indications (OK, created, accepted, etc.), redirection indications (multiple choices, moved permanently, etc.), client error indications (bad request, unauthorized, etc.), or server errors (internal server error, not implemented, etc.), in addition to or in place of the requested content.

A modified message, based on the received message or response, is then generated (block 608). In one implementation, the generation of the modified message may include the insertion of tags, such as a "HYBRID CACHING HEADER" tag or other extension headers (e.g., vender specific extension headers), in the received message. The tags may, for example, include indications of requested URLs. Alternatively, the generation of the modified message may include generating one or more pieces of information and forming a modified message by combining various pieces of information. For example, the hybrid proxy 107 may generate a Hybrid Cache Index (HCI) based on the received message, and the hybrid proxy 107 may then form a hybrid triplet as the modified message. In still other implementations, the hybrid proxy 107 may generate a second transmission (e.g., a multicast message separate from the HTTP 200 response) according to a peered-caching mechanism, as further discussed with reference to FIG. 5.

In some implementations, the modified message may include indications of "cacheable" content. Such indications may include server-specified expiration times of certain content, validators, or other implicit directives as defined in an application protocol, such as HTTP. The received message may include a cache-control header, in an implementation, that allows the hybrid proxy 107 to transmit a variety of caching directives in the modified message sent to a plurality of vehicles. For example, the hybrid proxy 107 may generate a modified message with a cache-control header indicating public, private, no-cache, no-store, no-transform, must-revalidate, proxy-revalidate, max-age, s-maxage, or cache-extension directives. In general, a modified message may indicate what content is cacheable, what content may be stored in a computer readable medium, controls or restrictions on reloading or validation of a cache, restrictions on transformation of content, etc.

After generating the modified message, the modified message is sent to a plurality of vehicles including the particular vehicle that is transporting the requesting device (block 610). That is, a hybrid proxy, or other suitable computing device, may send the modified message to both the particular vehicle (from which the original request for content was received) and to a plurality of other vehicles via a simultaneous, or otherwise timed, communication, such as a multicast. For example, the hybrid proxy 107 may send the modified message to the plurality of vehicle via a multicast on a selected forward link, where the selected forward link may be selected from a plurality of available forward links by the hybrid communications distributor 104. In an implementation, forward and/or reverse links may be selected as described in the aforementioned U.S. Provisional Patent Application No. 61/901,634 entitled "HYBRID COMMUNICATIONS FOR DEVICES ON VEHICLES".

In this manner, a hybrid proxy, such as the hybrid proxy 107, may send content to a plurality of vehicles, and the plurality of vehicles may subsequently update on-board hybrid caches with the content. This update of hybrid caches on a plurality of vehicles allows for efficient caching of data, information, or content in a hybrid communications system. In a scenario, hybrid caches in a plurality of aircraft may be updated only a few hundred milliseconds after a hybrid proxy sends a multicast to the plurality of aircraft.

Figure 7:
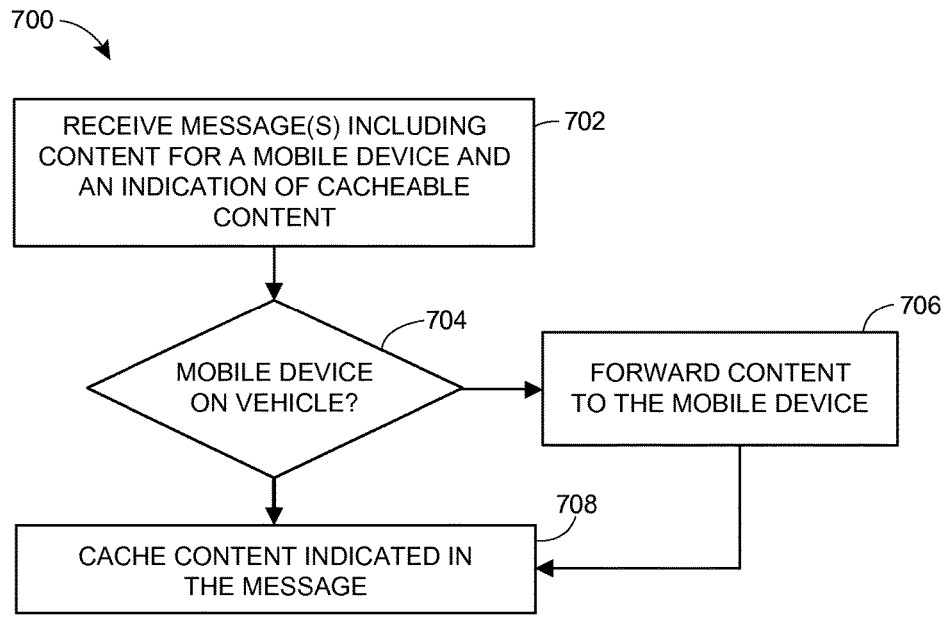
FIG. 7 is a flow diagram of an example method for caching communications for devices being transported by a vehicle which can be implemented in the on-board system illustrated in FIG. 2.

FIG. 7 is a flow diagram of an example method 700 for caching communications for devices being transported by a vehicle. The method 700 may be implemented in the hybrid cache 123 or the hybrid cache 209, for example.

First, a message is received (e.g., from the hybrid proxy 107) at a vehicle (block 702), where the message includes content for a requesting mobile computing device and includes an indication of cacheable content. The message may include a modified message as discussed further with respect to FIG. 6, for example. An on-board system, such as the on-board system 200, may receive the message via a selected forward link, in an implementation, and the message may be forwarded through a plurality of antennas, modems, etc. to the hybrid proxy 209.

Next, it is determined if the requesting mobile device is being transported by the vehicle (block 704). This determination may include identifying the requesting mobile device corresponding to content in the message via an IP address, MAC address, device configuration (browser, operating system), etc. However, in general, a hybrid cache may identify the requesting mobile device via any suitable information included in the received message. Alternatively, a hybrid cache may attempt to match an index, such as a Hybrid Cache Index (HCI), included in the received message with an indices corresponding to previously received requests for content from a device on-board the vehicle. If no match is found, a hybrid cache may determine that the requesting mobile computing device is not on-board the vehicle, and vice versa. Such indices for previously received request for content may be stored within a database or other computer readable storage medium on-board the vehicle (e.g., on-board data storage entity 218).

If it is determined that the requesting mobile computing device is being transported by the vehicle (i.e., on the vehicle), content in the received message is forwarded to the requesting mobile computing device (block 706). In one case, some, but not all, of the content included in the received message is to be delivered to the requesting mobile computing device. For example, a received message may include content for the requesting mobile computing device along with updates for a hybrid cache, content for other mobile computing devices, or information to be delivered to a cockpit electronics node. In such cases, only a portion of the content in the received message may be forwarded to the requesting mobile computing device. The remaining content may be forwarded to other devices on-board the vehicle and/or deleted after receipt.

If the requesting mobile computing device is not on the vehicle and/or after forwarding the content to the requesting mobile device, the flow continues to block 708, in an implementation. At block 708, some or all of the content included in the received message is stored in a computer readable storage media, or "cached," to fulfill future requests from devices on the vehicle. For example, the hybrid cache 209 may store all "cacheable" content (as further discussed with reference to FIG. 6) in the on-board data storage entity 218. In addition or alternatively, the hybrid cache 209 may update records in the on-board data storage entity 218 corresponding to an HCI. For example, the hybrid cache 209 may update an entry in the on-board data storage entity 218 corresponding to a request and/or corresponding response with any missing information from a hybrid triplet. In some cases, the hybrid cache 209 may only store a response message, such as a HTTP 200 response, and, in other cases, the hybrid cache 209 may store additional corresponding information such as indices, tags, extension headers, original requests, timestamps, device identification information, etc.

Figure 8:
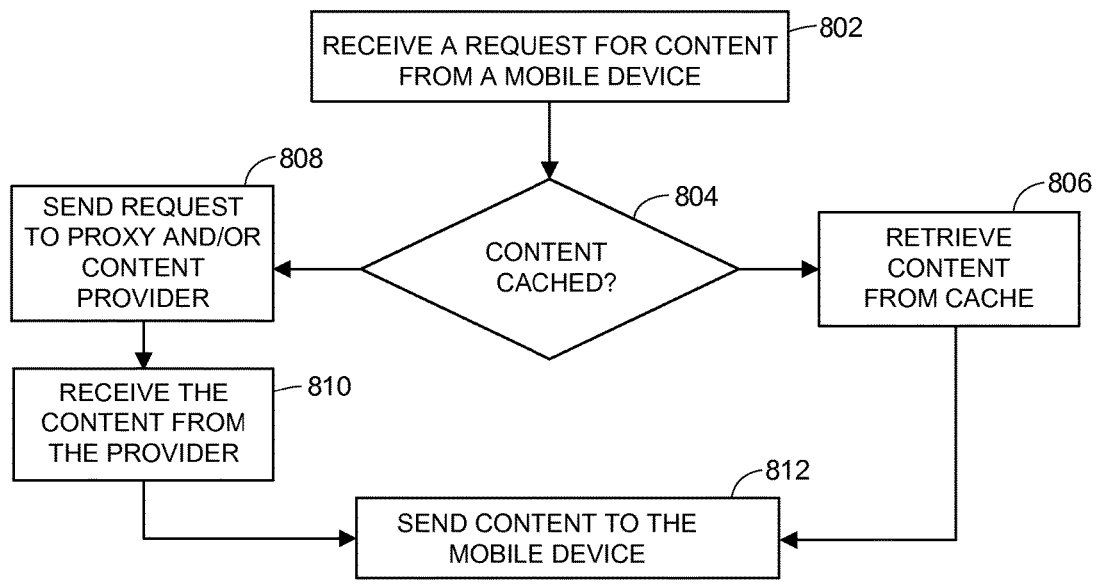
FIG. 8 is a flow diagram of an example method for fulfilling requests for content from on-board mobile computing devices which can be implemented in the on-board system illustrated in FIG. 2.

FIG. 8 is a flow diagram of example method 800 for fulfilling requests for content from on-board mobile computing devices, where fulfilling the requests involves retrieving cached content. The method 800 may also be implemented in the hybrid cache 123 or the hybrid cache 209, for example.

To begin, a request for content is received from a mobile computing device being transported by a vehicle (block 802). The request may include a request according to an HTTP GET method, for example, indicating a universal resource locator (URL) for a web page, or the request from the requesting device 300 may include indications of mobile application content, pictures, music, movies, etc. The request may be generated by a web browsing application or other "installed" application on the mobile computing device. For example, the request may be generated and sent after user interaction with an "in-flight" media or WiFi application, such as an application provided by an airline or other travel service provider allowing a user to access media content, mobile communications, or WiFi connections during a flight.

A hybrid cache may then determine whether the requested content is stored in a computer readable storage medium on-board the vehicle (block 804), that is, whether the content is "cached" on-board the vehicle. In some implementations, the hybrid cache 209 may query one or more databases stored in the on-board data storage entity 218 for the content. Such a query may utilize any suitable database query language or structure such as a structured query language (SQL), a document query language such as NoSQL, etc., and the query may utilize any distinguishing properties of the content, such as title, timestamp, keywords, URLs, data types, etc. Further, the hybrid cache 209 may query based on a Hybrid Cache Index (HCI) to associate the received request with previously received and cached content.

If the results of the determination indicate that the requested content is cached, the flow continues to block 806 where the requested content is retrieved. Specifically, the hybrid cache 209 may retrieve the requested content from the on-board data storage entity 218, in an implementation. However, if the results of the determination indicate that the request content is not cached, the flow may continue to block 808 where the request for content is forwarded to a terrestrial hybrid proxy and/or content provider (e.g., web server), as further described with reference to FIGS. 3 and 4. In response to the request being forwarded to the terrestrial proxy or content provider, the content may be received at the vehicle (block 810).

Next, the requested content is sent to the mobile computing device being transported by the vehicle (block 812). For example, the hybrid cache 209 in the on-board node 206 may send the requested content to the mobile computing device via a wireless communicative connection with the on-board node 206 facilitated by the one or more wireless access points 214. However, it is understood that the requested content may be communicated to the mobile computing device via any suitable wired or wireless connection.

Computing Devices in the Hybrid Communications System

FIG. 9 illustrates a block diagram of an example computing device 850 that may be utilized in the hybrid communications system 100. For example, one or more computing devices 850 may be particularly configured to be utilized as at least a portion of the data center 105, the vehicle data delivery network 106, the on-board node 120, the hybrid proxy 107, the hybrid cache 123 or 209, an ACPU, or the device 118. Additionally, other devices, such as a cockpit electronics node, may include an embodiment of the computing device 850.

The computing device 850 may include, for example, one or more central processing units (CPUs) or processors 852, and one or more busses or hubs 853 that connect the processor(s) 852 to other elements of the computing device 850, such as a volatile memory 854, a non-volatile memory 855, a display controller 856, and an I/O controller 857. The volatile memory 854 and the non-volatile memory 855 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 854 and/or the memory 855 may store instructions 558 that are executable by the processor 852. For example, in a computing device particularly configured to be included in the data center 105, the instructions 558 may be the instructions comprising the hybrid communications distributor 104. In another example, in a computing device 850 particularly configured to be the on-board node 120, the instructions 558 may be the instructions comprising the hybrid communications collector 122. In yet another example, in a computing device 850 particularly configured to be a device 118, the instructions 558 may be the Vehicle Travel Application (VTA). Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 854, 855 stores a subset of the modules and data structures identified herein. In other embodiments, at least one of the memories 854, 855 stores additional modules and data structures not described herein.

In an embodiment, the display controller 856 may communicate with the processor (s) 852 to cause information to be presented on a connected display device 859. In an embodiment, the I/O controller 857 may communicate with the processor(s) 852 to transfer information and commands to/from the user interface 860, which may include a mouse, a keyboard or key pad, a touch pad, click wheel, lights, a speaker, a microphone, etc. In an embodiment, at least portions of the display device 859 and of the user interface 860 are combined in a single, integral device, e.g., a touch screen. Additionally, data or information may be transferred to and from the computing device 850 via a network interface 870. In some embodiments, the computing device 850 may include more than one network interface 870, such as a wireless interface and a wired interface.

The illustrated computing device 850 is only one example of a computing device suitable to be particularly configured for use in the hybrid communications system 100. Other embodiments of the computing device 850 may be also be for use in the hybrid communications system 100, even if the other embodiments have more or fewer components than shown in FIG. 10, have one or more combined components, or have a different configuration or arrangement of the components. Moreover, the various components shown in FIG. 10 can be implemented in hardware, a processor executing software instructions, or a combination of both hardware and a processor executing software instructions, including one or more signal processing and/or application specific integrated circuits.

Additional Considerations

When implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, upon reading this disclosure, those of skill in the art will appreciate still additional alternative structural and functional designs for a system and a method for data caching in a hybrid communications system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A method of managing communications to and from devices transported by vehicles, the method comprising:
receiving, from a particular vehicle via a reverse link, a request for content to be delivered to a requesting device, the requesting device being a mobile computing device that is temporarily being transported by the particular vehicle;
in response to forwarding the request to a content provider, receiving, from the content provider, a message including the content to be delivered to the requesting device;
generating, with the one or more computer processors, a modified message including an indication of at least some of the content, the at least some of the content to be cached in a plurality of computer readable storage media disposed in a plurality of vehicles, and the plurality of vehicle including the particular vehicle; and
causing, with the one or more computer processors, the modified message to be sent to a plurality of vehicles via a forward link.

2. The method according to aspect 1, further comprising generating an index, the index indicating a correspondence between: (i) the request for content, and (ii) the message including the content.

3. The method according to either aspect 1 or aspect 2, further comprising generating the modified message by combining the index, the request for content, and the message including the content.

4. The method according to any one of the preceding aspects, further comprising:
receiving, from the particular vehicle via the reverse link, the request for content to be delivered to the requesting device, the revere link being supported by a first frequency band; and
causing the modified message to be sent to the plurality of vehicles via the forward link, the forward link being supported by a second frequency band different from the first frequency band.

5. The method according to any one of the preceding aspects, further comprising:
receiving, from the particular vehicle via the reverse link, the request for content to be delivered to the requesting device, the revere link utilizing a first wireless communication protocol; and
causing the modified message to be sent to the plurality of vehicles via the forward link, the forward link utilizing a second wireless communication protocol different from the first wireless communication protocol.

6. The method according to any one of the preceding aspects, further comprising generating the modified message by inserting one or more tags into the message including the content.

7. The method according to any one of the preceding aspects, further comprising generating the modified message by inserting one or more tags into the message including the content, the tags indicating one or more Uniform Resource Locators.

8. The method according to any one of the preceding aspects, further comprising generating the modified message by inserting an indication of cacheable content into the message including the content, the indication of cacheable content including one or more directives.

9. The method according to any one of the preceding aspects, further comprising generating the modified message based on at least one of a mirrored version of the request to a content or a mirrored version of the message including the content.

10. A method of caching communications for devices transported by vehicles, the method comprising:
receiving, at a vehicle via a forward link, a message directed to the vehicle and a plurality of other vehicles, the message including:
(i) content to be delivered to a requesting mobile computing device being transported by the vehicle or one of the plurality of other vehicles, and
(ii) an indication of at least some of the content to be cached in one or more computer readable storage media disposed on the vehicle;
determining, with one or more processors, if the requesting mobile computing device is being transported by the vehicle;
if the requesting mobile computing device is being transported by the vehicle, forwarding at least some of the content to the requesting mobile computing device;
storing, with the one or more processors, the at least some of the content on the one or more computer readable storage media disposed in the vehicle based on the indication of the least some of the content to be cached.

11. The method of aspect 10, further comprising:
receiving the message directed to the vehicle and a plurality of other vehicles, the message including content to be delivered to the requesting mobile computing device transported by one of the plurality of other vehicles, and the requesting mobile computing device being a first mobile computing device;
receiving, from a second mobile computing device, a request for the at least some of the content stored on the one or more computer readable storage media, the second mobile computing device being temporarily transported by the vehicle;
retrieving, with the one or more processors, the at least some of the content from the one or more computer readable storage media; and
causing, with the one or more processors, the retrieved at least some of the content to be sent to the second mobile computing device.

12. The method of either aspect 10 or aspect 11, further comprising:
receiving the message directed to the vehicle and a plurality of other vehicles, the message including content to be delivered to the requesting mobile computing device, the content being first content, and the requesting mobile computing device being a first mobile computing device;
receiving, from a second mobile computing device, a request for second content different from the first content, the second mobile computing device being different from the first mobile computing device;
determining, with the one or more processors, if the second content is stored on the one or more computer readable media; and
one of:
if the second content is stored on the one or more computer readable media, retrieving, with the one or more processors, the second content from the one or more computer readable storage media, or
if the second content is not stored on the one or more computer readable media, causing a request for the second content to be sent, via a reverse link, to a terrestrial content provider.

13. The method according to any one of aspects 10 to 12, further comprising:
receiving, at the vehicle via the forward link, the message directed to the vehicle and the plurality of other vehicles, the forward link being supported by a first frequency band; and
causing the request for the second content to be sent, via the reverse link, to the terrestrial content provider, the reverse link being supported by a second frequency band different from the first frequency band.

14. The method according to any one of aspects 10 to 13, further comprising determining if the requesting mobile computing device is being transported by the vehicle including querying a database of indices for an index corresponding to a request for the content to be delivered to the requesting mobile computing device.

15. The method according to any one of aspects 10 to 14, further comprising receiving, at the vehicle via the forward link, the message directed to the vehicle and the plurality of other vehicles, the message including the indication of at least some of the content to be cached in the computer readable storage medium disposed on the vehicle, and the indication of at least some of the content including directives related to cacheable content.

16. The method according to any one of aspects 10 to 15, further comprising storing missing information in the received message on one or more computer readable storage media disposed in the vehicle, the missing information including one or more of (i) a request for the content to be delivered to the requesting mobile computing device, (ii) a portion of the received message including the content to be delivered to the requesting computing device, or (iii) an index representing a correspondence between (i) and (ii).

17. The method according to any one of aspects 10 to 16, further comprising storing missing information in the received message on one or more computer readable storage media disposed in the vehicle, the missing information including two or more of (i) a request for the content to be delivered to the requesting mobile computing device, (ii) a portion of the received message including the content to be delivered to the requesting computing device, or (iii) an index representing a correspondence between (i) and (ii).

19. A computer device for managing communication to and from vehicles via data caching, the computer device comprising:
one or more processors; and
one or more memories coupled to the one or more processors;
wherein the one or more memories include nontransitory computer executable instructions stored therein that, when executed by the one or more processors, cause the one or more processors to:
receive, at a vehicle via a forward link, a message directed to the vehicle and a plurality of other vehicles, the message including:
(i) content to be delivered to a requesting mobile computing device being transported by the vehicle or one of the plurality of other vehicles, and (ii) an indication of at least some of the content to be cached in one or more computer readable storage media disposed on the vehicle;
determine if the requesting mobile computing device is being transported by the vehicle;
if the requesting mobile computing device is being transported by the vehicle, forward at least some of the content to the requesting mobile computing device;
store the at least some of the content on the one or more computer readable storage media disposed in the vehicle based on the indication of the least some of the content to be cached.

20. The computer device of aspect 19, wherein the computer executable instructions further cause the one or more processors to:
receive the message directed to the vehicle and a plurality of other vehicles, the message including content to be delivered to the requesting mobile computing device being transported by one of the plurality of other vehicles, and the requesting mobile computing device being a first mobile computing device;
receive, from a second mobile computing device, a request for the at least some of the content stored on the one or more computer readable storage media, the second mobile computing device being temporarily transported by the vehicle;
retrieve the at least some of the content from the one or more computer readable storage media; and
cause the retrieved at least some of the content to be sent to the second mobile computing device.

What is claimed:

1. A method of caching communications for devices transported by vehicles, the method comprising:
receiving, at a vehicle via a forward link, a message directed to the vehicle and a plurality of other vehicles, the message including:
(i) content to be delivered to a requesting mobile computing device being transported by the vehicle or one of the plurality of other vehicles, and
(ii) an indication of at least some of the content to be cached in one or more computer readable storage media disposed on the vehicle;
determining, with one or more processors, if the requesting mobile computing device is being transported by the vehicle;
if the requesting mobile computing device is being transported by the vehicle, forwarding at least some of the content to the requesting mobile computing device;
storing, with the one or more processors, the at least some of the content on the one or more computer readable storage media disposed in the vehicle based on the indication of the least some of the content to be cached.

2. The method of claim 1, further comprising:
receiving the message directed to the vehicle and a plurality of other vehicles, the message including content to be delivered to the requesting mobile computing device transported by one of the plurality of other vehicles, and the requesting mobile computing device being a first mobile computing device;
receiving, from a second mobile computing device, a request for the at least some of the content stored on the one or more computer readable storage media, the second mobile computing device being temporarily transported by the vehicle;
retrieving, with the one or more processors, the at least some of the content from the one or more computer readable storage media; and
causing, with the one or more processors, the retrieved at least some of the content to be sent to the second mobile computing device.

3. The method of claim 1, further comprising:
receiving the message directed to the vehicle and a plurality of other vehicles, the message including content to be delivered to the requesting mobile computing device, the content being first content, and the requesting mobile computing device being a first mobile computing device;
receiving, from a second mobile computing device, a request for second content different from the first content, the second mobile computing device being different from the first mobile computing device;
determining, with the one or more processors, if the second content is stored on the one or more computer readable media; and
one of:
if the second content is stored on the one or more computer readable media, retrieving, with the one or more processors, the second content from the one or more computer readable storage media, or
if the second content is not stored on the one or more computer readable media, causing a request for the second content to be sent, via a reverse link, to a terrestrial content provider.

4. The method of claim 3, further comprising:
receiving, at the vehicle via the forward link, the message directed to the vehicle and the plurality of other vehicles, the forward link being supported by a first frequency band; and
causing the request for the second content to be sent, via the reverse link, to the terrestrial content provider, the reverse link being supported by a second frequency band different from the first frequency band.

5. The method of claim 3, further comprising,
receiving, at the vehicle via the forward link, the message directed to the vehicle and the plurality of other vehicles, the forward link utilizing a first wireless communication protocol; and
causing the request for the second content to be sent, via the reverse link, to the terrestrial content provider, the reverse link utilizing a second wireless communication protocol different from the first wireless communication protocol.

6. The method of claim 1, further comprising determining if the requesting mobile computing device is being transported by the vehicle including querying a database of indices for an index corresponding to a request for the content to be delivered to the requesting mobile computing device.

7. The method of claim 1, further comprising receiving, at the vehicle via the forward link, the message directed to the vehicle and the plurality of other vehicles, the message including the indication of at least some of the content to be cached in the computer readable storage medium disposed on the vehicle, and the indication of at least some of the content including directives related to cacheable content.

8. The method of claim 1, further comprising storing missing information in the received message on one or more computer readable storage media disposed in the vehicle, the missing information including one or more of (i) a request for the content to be delivered to the requesting mobile computing device, (ii) a portion of the received message including the content to be delivered to the requesting computing device, or (iii) an index representing a correspondence between (i) and (ii).

9. The method of claim 1, further comprising receiving, at the vehicle via the forward link, the message directed to the vehicle and the plurality of other vehicles, the message including one or more tags.

10. The method of claim 1, further comprising receiving, at the vehicle via the forward link, the message directed to the vehicle and the plurality of other vehicles, the message including one or more tags, the tags indicating one or more Uniform Resource Locators.

11. A computer device for managing communication to and from vehicles via data caching, the computer device comprising:
one or more processors; and
one or more memories coupled to the one or more processors;
wherein the one or more memories include nontransitory computer executable instructions stored therein that, when executed by the one or more processors, cause the one or more processors to:
receive, at a vehicle via a forward link, a message directed to the vehicle and a plurality of other vehicles, the message including:
(i) content to be delivered to a requesting mobile computing device being transported by the vehicle or one of the plurality of other vehicles, and
(ii) an indication of at least some of the content to be cached in one or more computer readable storage media disposed on the vehicle;
determine if the requesting mobile computing device is being transported by the vehicle;
if the requesting mobile computing device is being transported by the vehicle, forward at least some of the content to the requesting mobile computing device;
store the at least some of the content on the one or more computer readable storage media disposed in the vehicle based on the indication of the least some of the content to be cached.

12. The computer device of claim 11, wherein the requesting mobile computing device is a first mobile computing device, and wherein the computer executable instructions further cause the one or more processors to:
receive, from a second mobile computing device, a request for the at least some of the content stored on the one or more computer readable storage media, the second mobile computing device being temporarily transported by the vehicle;
retrieve the at least some of the content from the one or more computer readable storage media; and
cause the retrieved at least some of the content to be sent to the second mobile computing device.

13. The computer device of claim 11, wherein the content is first content, and the requesting mobile computing device is a first mobile computing device, and wherein the computer executable instructions further cause the one or more processors to:
receive, from a second mobile computing device, a request for second content different from the first content, the second mobile computing device being different from the first mobile computing device;
determine if the second content is stored on the one or more computer readable media; and
one of:
if the second content is stored on the one or more computer readable media, retrieve the second content from the one or more computer readable storage media, or
if the second content is not stored on the one or more computer readable media, cause a request for the second content to be sent, via a reverse link, to a terrestrial content provider.

14. The computer device of claim 13, wherein the forward link is supported by a first frequency band, and wherein the reverse link is supported by a second frequency band, the second frequency band being different from the first frequency band.

15. The computer device of claim 13, wherein the forward link utilizes a first wireless communication protocol; and wherein the reverse link utilizes a second wireless communication protocol different from the first wireless communication protocol.

16. The computer device of claim 11, wherein the computer executable instructions that cause the one or more processors to determine if the requesting mobile computing device is being transported by the vehicle include computer executable instructions that cause the one or more processors to query a database of indices for an index corresponding to a request for the content to be delivered to the requesting mobile computing device.

17. The computer device of claim 11, wherein the indication of at least some of the content includes directives related to cacheable content.

18. The computer device of claim 11, wherein the computer executable instructions further cause the one or more processors to store missing information in the received message on one or more computer readable storage media disposed in the vehicle, the missing information including one or more of:
(i) a request for the content to be delivered to the requesting mobile computing device,
(ii) a portion of the received message including the content to be delivered to the requesting computing device, or
(iii) an index representing a correspondence between (i) and (ii).

19. The computer device of claim 11, wherein the message includes one or more tags.

20. The computer device of claim 11, wherein the message includes one or more tags indicating one or more Uniform Resource Locators.

* * * * *